United States Patent
Tran et al.

(10) Patent No.: US 11,545,131 B2
(45) Date of Patent: Jan. 3, 2023

(54) READING ORDER SYSTEM FOR IMPROVING ACCESSIBILITY OF ELECTRONIC CONTENT

(71) Applicant: MICROSOFT TECHNOLOGY LICENSING, LLC, Redmond, WA (US)

(72) Inventors: Tracy ThuyDuyen Tran, Seattle, WA (US); Emily Tran, Seattle, WA (US); Daniel Yancy Parish, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 16/512,882

(22) Filed: Jul. 16, 2019

(65) Prior Publication Data

US 2021/0020159 A1    Jan. 21, 2021

(51) Int. Cl.
| | |
|---|---|
| *G10L 13/00* | (2006.01) |
| *G06F 3/01* | (2006.01) |
| *G06V 30/416* | (2022.01) |
| *G09B 21/00* | (2006.01) |

(52) U.S. Cl.
CPC .............. *G10L 13/00* (2013.01); *G06F 3/013* (2013.01); *G06V 30/416* (2022.01); *G09B 21/006* (2013.01)

(58) Field of Classification Search
CPC .......... G10L 13/04; G06F 3/01; G06F 3/013; G06K 9/00; G06V 30/416; G09B 21/006
See application file for complete search history.

(56) References Cited

U.S. PATENT DOCUMENTS

| | | | |
|---|---|---|---|
| 8,015,009 B2* | 9/2011 | Harband | G10L 13/00 704/260 |
| 8,069,125 B2 | 11/2011 | Jung et al. | |
| 8,434,867 B2 | 5/2013 | Helfman et al. | |
| 8,571,851 B1* | 10/2013 | Tickner | G10L 15/1815 704/9 |

(Continued)

FOREIGN PATENT DOCUMENTS

EP    3349124 A1    7/2018

OTHER PUBLICATIONS

"Document Layout Analysis and Reading Order Determination for a Reading Robot", by Pan et al., pp. 1-6 (Year: 2010).*

(Continued)

*Primary Examiner* — William L Bashore
*Assistant Examiner* — Gregory A Distefano
(74) *Attorney, Agent, or Firm* — NovoTechIP International PLLC

(57) ABSTRACT

A reading order extrapolation and management system and process for facilitating auditory comprehension of electronic documents. As an example, a user may access contents of an electronic document via an application and request a speech-synthesized recitation of any media in the electronic document. The application may make use of a reading order that has been specifically generated and improved by reference to eye tracking data from users reading the document. A reading order can be assigned to a document and implemented when, for example, a screen reader is engaged for use with the document. Such systems can be of great benefit to users with visually impairments and/or distracted users seeking a meaningful audio presentation of textual content.

18 Claims, 17 Drawing Sheets

(56) References Cited

U.S. PATENT DOCUMENTS

| | | | |
|---|---|---|---|
| 8,649,606 B2 | 2/2014 | Zhao et al. | |
| 9,239,956 B2 | 1/2016 | Hein | |
| 9,575,960 B1* | 2/2017 | Lerner | G06F 40/30 |
| 10,282,533 B2 | 5/2019 | Lindemann | |
| 2004/0128534 A1* | 7/2004 | Walker | H04L 67/22 |
| | | | 726/13 |
| 2006/0139319 A1* | 6/2006 | Kariathungal | G16H 30/20 |
| | | | 345/156 |
| 2006/0238707 A1* | 10/2006 | Elvesjo | A61B 3/113 |
| | | | 351/209 |
| 2008/0155437 A1* | 6/2008 | Morris | G06F 9/451 |
| | | | 715/765 |
| 2011/0087659 A1* | 4/2011 | Dey | G06F 16/3334 |
| | | | 707/728 |
| 2013/0246383 A1* | 9/2013 | White | G06F 16/9535 |
| | | | 707/706 |
| 2013/0311925 A1* | 11/2013 | Denker | G06F 3/013 |
| | | | 715/771 |
| 2014/0344012 A1* | 11/2014 | Kamhi | G06F 3/013 |
| | | | 705/7.29 |
| 2016/0041949 A1* | 2/2016 | Gluck | G06F 40/117 |
| | | | 715/256 |
| 2020/0311392 A1* | 10/2020 | Mande | G06V 40/169 |

OTHER PUBLICATIONS

"International Search Report and Written Opinion Issued in PCT Application No. PCT/US20/033336", dated Sep. 11, 2020, 11 Pages.

\* cited by examiner

|  | USER A | USER B | USER C | USER D | USER E | USER F | USER G | USER H | USER I | USER J | RO |
|---|---|---|---|---|---|---|---|---|---|---|---|
| CONTENT 1 | 1ST | 2ND | 1ST | 1ST | 1ST | 1ST | 1ST | 1ST | 1ST | 1ST | 1ST |
| CONTENT 2 | 3RD | 1ST | 3RD | 3RD | 2ND | 3RD | 3RD | 2ND | 3RD | 3RD | 3RD |
| CONTENT 3 | 2ND | 3RD | 2ND | 2ND | 3RD | 2ND | 2ND | 3RD | 2ND | 2ND | 2ND |
| CONTENT 4 | 4TH | 4TH | 4TH | 4TH | 4TH | 4TH | 4TH | 4TH | 4TH | 4TH | 4TH |
| CONTENT 5 | 5TH | 5TH | 5TH | 5TH | 5TH | 5TH | 5TH | 5TH | 5TH | 5TH | 5TH |
| CONTENT 6 | 6TH | 7TH | 6TH | 6TH | 6TH | 6TH | 6TH | 6TH | 6TH | 8TH | 6TH |
| CONTENT 7 | 7TH | 6TH | 7TH | 7TH | 7TH | 7TH | 7TH | 7TH | 7TH | 9TH | 7TH |
| CONTENT 8 | 10TH | 9TH | 8TH | 8TH | 8TH | 8TH | 8TH | 8TH | 8TH | 6TH | 8TH |
| CONTENT 9 | 8TH | 8TH | 9TH | 9TH | 9TH | 9TH | 9TH | 9TH | 9TH | 7TH | 9TH |
| CONTENT 10 | 9TH | 10TH | 10TH | 10TH | 10TH | 10TH | 10TH | 10TH | 10TH | 10TH | 10TH |
| CONTENT 11 | 11TH | 11TH | 11TH | 11TH | 11TH | 11TH | 11TH | 11TH | 11TH | 11TH | 11TH |

FIG. 7

READING ORDER SYSTEM FOR IMPROVING ACCESSIBILITY OF ELECTRONIC CONTENT

BACKGROUND

Electronic devices, including portable electronic devices, have gained widespread use and are now configured to provide a variety of functions including, for example, instant messaging, teleconference capability, and other personal information manager (PIM) application functions. Media-to-speech synthesis can be used in a number of applications to convert normal language text, pictures, charts, diagrams, and other electronic content into speech, and can be implemented in software or hardware. For example, those who are engaged in an activity that restricts their ability to read text may use text-to-speech systems to have the textual material read to them. The use of media-to-speech synthesis is attractive in portable electronic devices, such as for the reading of email and text messages.

Furthermore, in cases where the user has a visual disability, or is attending to other tasks, such as driving a car, it becomes highly undesirable for such a user to be required to read any document, and so the user may turn to a media-to-speech synthesis application. However, electronic documents typically contain a variety of digital content types such as text, images, slides, and spreadsheets that are arranged across different spatial orientations on the page. The presence of such content elements or units can make the listening experience more challenging for a user. Thus, there remain significant areas for new and improved ideas for the management of speech synthesis of electronic documents, as well as enhancing the ability of a user to follow the content and maintain a sense of continuity of document information that is conveyed through audio.

SUMMARY

A system, in accord with a first aspect of this disclosure, includes a processor and machine-readable media including instructions which, when executed by the processor, cause the processor to present, via a first client system, a first electronic content item, identify a first plurality of content portions of the first electronic content item, each content portion associated with a different (spatial) region of the first electronic content item as presented, and receive, from the first client system, first eye gaze data generated during the presentation of the first electronic content item, the first eye gaze data including a first distribution of gaze points. The instructions further cause the processor to detect a first series of fixation clusters in the first eye gaze data, each fixation cluster comprising an aggregation of gaze points within the first distribution of gaze points that occur closely in time and space, identify which region of the first electronic item as presented corresponds to each fixation cluster and assigning each fixation cluster a content portion of the first plurality of content portions associated with that region, produce and store a first user attention sequence identifying each content portion according to an order in which the aggregation of gaze points for each matching fixation cluster of the first series was generated, calculate a first reading order for the first electronic content item based at least on the first user attention sequence, and assign the first reading order to the first electronic content item.

A method of assigning a reading order for audio playback of electronic content items, in accordance with a second aspect, includes presenting, via a first client system, a first electronic content item, identifying a first plurality of content portions of the first electronic content item, each content portion associated with a different (spatial) region of the first electronic content item as presented, and receiving, from the first client system, first eye gaze data generated during the presentation of the first electronic content item, the first eye gaze data including a first distribution of gaze points. The method further includes detecting a first series of fixation clusters in the first eye gaze data, each fixation cluster comprising an aggregation of gaze points within the first distribution of gaze points that occur closely in time and space, and identifying which region of the first electronic item as presented corresponds to each fixation cluster and assigning each fixation cluster a content portion of the first plurality of content portions associated with that region. In addition, the method includes producing and storing a first user attention sequence identifying each content portion according to an order in which the aggregation of gaze points for each matching fixation cluster of the first series was generated, calculating a first reading order for the first electronic content item based at least on the first user attention sequence, and assigning the first reading order to the first electronic content item.

A system, in accordance with a third aspect of this disclosure, includes means for presenting, via a first client system, a first electronic content item, means for identifying a first plurality of content portions of the first electronic content item, each content portion associated with a different (spatial) region of the first electronic content item as presented, and means for receiving, from the first client system, first eye gaze data generated during the presentation of the first electronic content item, the first eye gaze data including a first distribution of gaze points. The system also includes means for detecting a first series of fixation clusters in the first eye gaze data, each fixation cluster comprising an aggregation of gaze points within the first distribution of gaze points that occur closely in time and space, means for identifying which region of the first electronic item as presented corresponds to each fixation cluster and assigning each fixation cluster a content portion of the first plurality of content portions associated with that region, and means for producing and storing a first user attention sequence identifying each content portion according to an order in which the aggregation of gaze points for each matching fixation cluster of the first series was generated. The system further includes means for calculating a first reading order for the first electronic content item based at least on the first user attention sequence, and means for assigning the first reading order to the first electronic content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 7 is an example of a chart presenting some possible user attention sequences for an electronic content item that can be used to generate a reading order for the electronic content item;

DETAILED DESCRIPTION

Figure 1A:
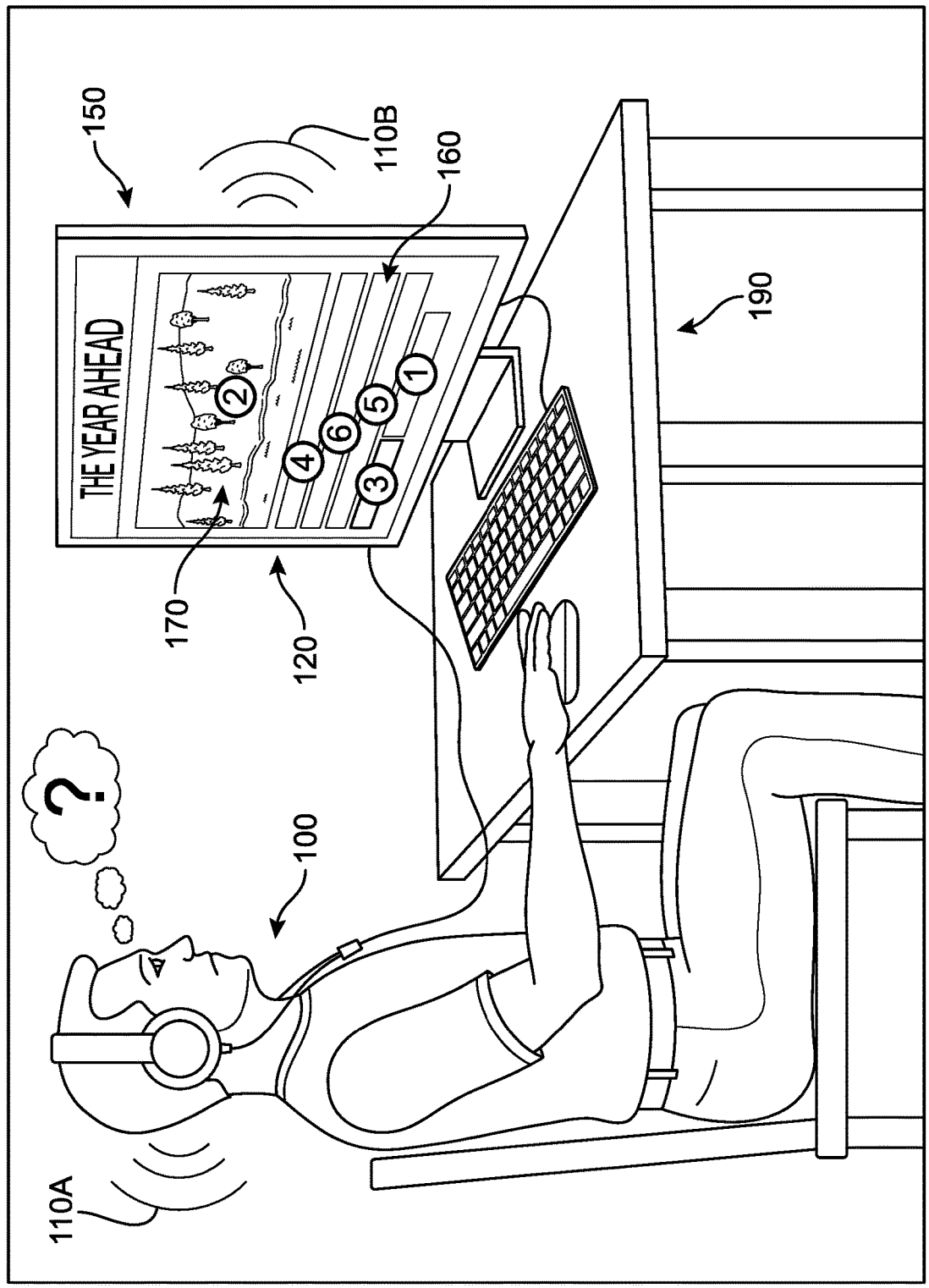
FIGS. 1A and 1B are an example of a computing environment with an implementation of a document presentation client application with audio playback of a document.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

It is common for individuals with visual impairments to use screen readers to help them access digital information. A screen reader typically converts or 'translates' the electronic content, such as an app, website, document, presentation that are inherently two-dimensional spatial layouts into a linear audio stream, 'reading' aloud the corresponding screen content to the user who are unable to see the screen. The order in which a screen reader parses through the displayed information will be referred to herein as a "reading order". As one example, a reading order for a standard webpage might follow a sequence in which the home page button, the buttons in the top level menu, and then the main heading, are read aloud. Traditionally, a reading order is based on a standard left to right text and media scanning, which often results in an inaccurate or confusing presentation of the information. In many cases, a direct reduction of a spatial layout to a linear audio stream can also result in a significant loss of information and decreased understanding. The need for a reading order that accurately represents the most appropriate and user-friendly presentation of the spatially presented information is paramount in such cases. The following implementations introduce an electronic content audio playback management system and a process for facilitating a user's listening and comprehension experience. The system will be used in conjunction with screen readers or other digital content reading applications. In some examples, the system can detect and obtain the gaze direction sequence of many sighted users, accumulate such data, determine patterns in the sighted users' attention sequence while reviewing the electronic content, and use this information to generate a more optimal reading order for the electronic content. Thus, the system can be configured to extrapolate reading order based on this collection of gaze direction data of sighted users. As a more specific example, the system may determine that most people, upon loading a particular electronic content item or interface, look (gaze) at the top right corner first, and then the top left corner. This suggests that the correct reading order for this content begins with the element in the top right followed by the one in the top left. The system can then automatically establish the reading order for this interface as such, and someone subsequently using a screen reader for this content will be able to parse the interface elements in the same order as a sighted person.

As a general matter, various terms associated with blindness, including but not limited to, low vision, blind, legally blind, vision or visual impairment, and other such terms will refer to a diminishment of a person's visual acuity and/or visual field. Individuals are identified as having low vision when they have visual acuity of 20/70 to 20/200 in the better eye after correction (i.e., with eyeglasses or contacts) or a visual field limited to 20-40" after correction. Legal blindness has been defined as visual acuity of less than 20/200 in the better eye after correction or a visual field limited to less than 20". Furthermore, whereas individuals with legal blindness may have some functional residual vision, individuals identified as blind have either no vision or only the ability to perceive the presence of light. Generally, the term "sensory substitution" as used herein refers to the concept of converting one type of human sensory signal or modality into another modality. For example, a first modality may include visual signals, and a second modality may include audio signals. Such translation of sensory signals can be used to facilitate the everyday functioning of individuals with some form of sensory loss, notably blindness. The following implementations describe a system configured to apply sensory substitution to enable blind people to process visually derived information by one of their intact senses—in this case, through their sense of hearing.

As a reader who is visually impaired accesses and/or listens to playback of a document, they may be slowed or perplexed in cases where there are large numbers of content portions (or content events), or what seem to be disjointed recitations as the document moves from one topic or section to another, particularly if the document is large or covers a range of information types. In some cases, the 'big picture' message of a document or file may be obscured as the user is bombarded with long stretches of recited text with little or no indication of structure or sequence. As will be described below, the proposed system provides users the ability to more thoughtfully receive and engage with material that is being converted from a spatial stream to an audio stream, permitting a greater appreciation and grasp of the electronic content, as well as a more comprehensive and intuitive sense of the ideas contained in their documents. This in turn can improve the ability of individuals to manage their consumption of electronic documents and facilitate a more natural and effective absorption or recall of the information contained in such documents. As will be discussed below, these systems and methods can also offer an effective set of communication tools for mimicking the presentation experiences of other readers of the document and enrich their overall listening experience.

As introduced above, applications such as word processors, publishers, spreadsheets, presentation software, and others can be used to generate electronic documents that contain electronic content. Generally, the term "electronic document" or "document" includes any digital data that may be spatially presented (e.g., visually), and may comprise a plurality of separate but connected electronic content items and portions thereof, such as a media item, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, image documents that include images of text that may be extracted using optical character recognition (OCR) processes, documents that may include mixtures of text and images, such as Portable Document Format (PDF) documents or PowerPoint (PPT) documents, etc., or any type or format of document from which text may be extracted or that may be converted to text, and other digital data. As an example, this electronic content may include word processing documents, spreadsheets, presentations, e-books, or other digital-based media.

Furthermore, within some types of documents, the electronic content can be understood to include a plurality of content elements or content portions. In general, a content portion includes any part of electronic content that is defined or discernable as a part. For example, a content portion may be automatically discerned from a characteristic of the content portion itself (e.g., a letter, number, word, sentence, paragraph, section, image, symbol, or chapter of an electronic document, or other file format designation) or may be manually defined by a reviewer or end-user (e.g., selected collection of words in an electronic document, a selected portion of a digital image, a selected group of cells in a spreadsheet, a selected region in a slide from a presentation), or correspond to the manner in which the electronic content was created. Examples of content portions include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

In addition, a user or participant generally refers to one who views, develops, collaborates, suggests, listens, receives, shares, reviews, revises, or disseminates pieces of electronic content, including the creation, viewing, or updating of comments associated with the electronic content. A user includes a reader or listener of electronic content based application programs, as well as a user of the apparatus and systems described herein. Furthermore, the term "software application", "software", or "application" refers to a computer program that performs useful work, generally unrelated to the computer itself. Some non-limiting examples of software applications include text-to-speech applications, speech synthesizer applications, word processors, spreadsheets, slideshows, presentation design applications, accounting systems, and telecommunication programs, as well as gaming software, utility and productivity tools, mobile applications, presentation graphics, and other productivity software.

In different implementations, software applications such as programs offered in the Microsoft Office Suite® (e.g., Word®, PowerPoint®, Excel®, Visio®, Skype®, Teams®), Office 365®, Microsoft 365®, web-browsing applications such as Microsoft Internet Explorer®, Microsoft Edge®, and other suites or applications can offer a variety of electronic content or document presentation and editing tools. In other implementations, Google Sheets® and Google Slides®, or another word processing or data presentation program, such as Apple Pages®, Corel WordPerfect®, Google Docs® or Chrome®, IBM Lotus Word Pro® or other software applications within the Microsoft Office Suite® or array of Microsoft® products as well as any non-Microsoft® based applications may be used. These are non-limiting examples, and any other electronic content creation, editing, or collaboration application may benefit from the disclosed implementations. Throughout this description, the software application that is used to originally create or normally view (e.g., on a desktop) the electronic content will be referred to as the native application.

Figure 1B:
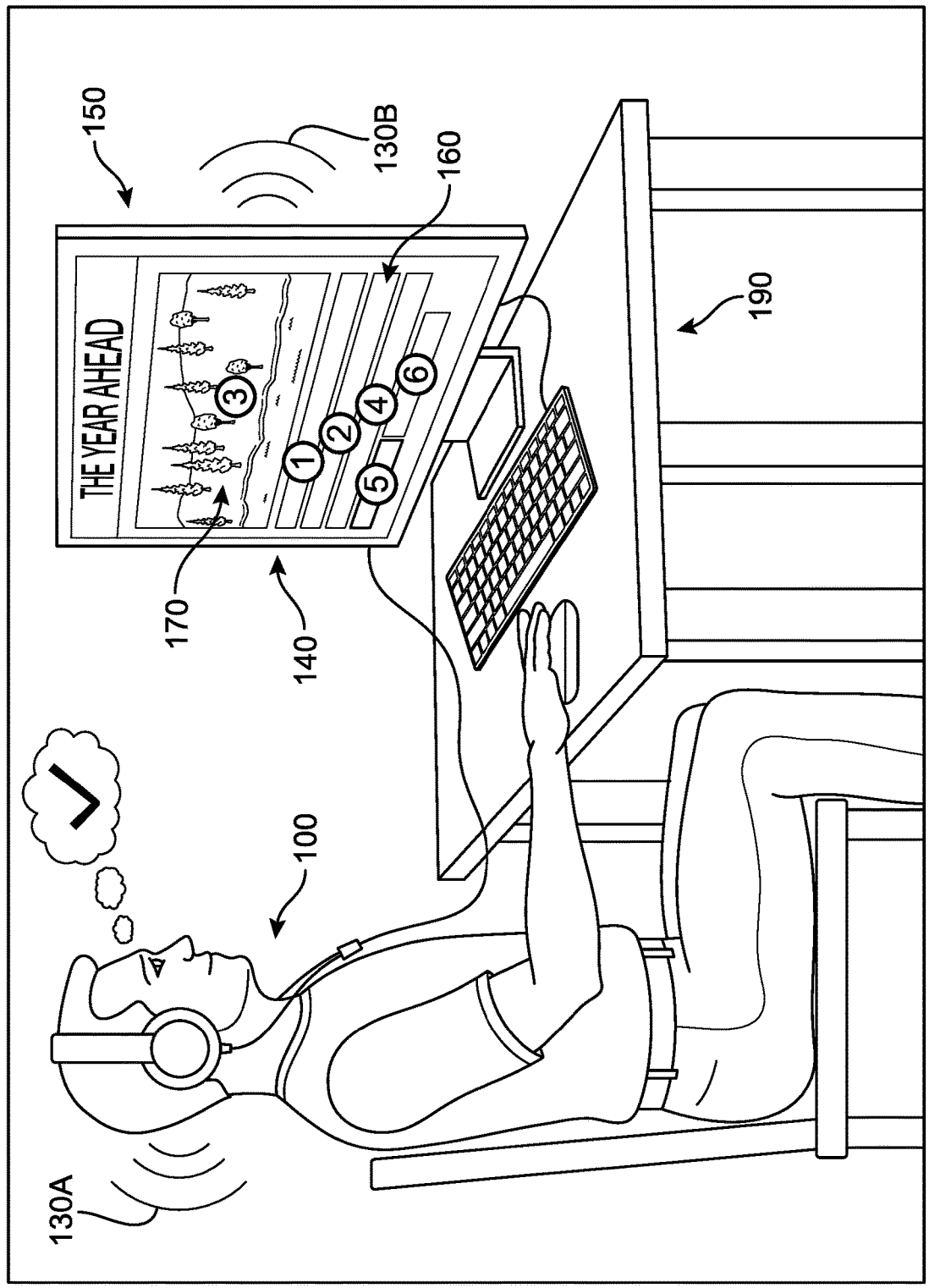

In order to better introduce the systems and methods to the reader, FIGS. 1A and 1B presents a high-level example of a representative computing environment ("environment") 190 for implementing an electronic content reading order management system. In different implementations, the environment 190 can include one or more computing device end-users, or simply "users". One or more users can interact with or manipulate data presented via a user device. The various features and activities illustrated in FIGS. 1A and 1B are described generally, with further details and examples presented in connection with later figures.

As an example, a first user 100 is shown in FIGS. 1A and 1B. In this case, the first user 100 is a visually-impaired user of a first client computing system ("first client") 150. The first user 100 is accessing a document presentation client application ("presentation client") 160, represented by a user interface in this example, via the first client 150. The first client 150 shown here includes a desktop computer, headphones, and screen reader system. However, in other implementations, the device may be a personal computer such as a laptop computer, a tablet, a mobile device, or any other computer system having access to electronic documents. The first client 150 executes an operating system such as Microsoft Windows®, Mac OS®, Unix®, or other operating system, and includes memory, storage, a network interface, and other computer hardware not illustrated herein. The first client 150 can be configured to respond to instructions generated by the presentation client 160. In FIGS. 1A and 1B, only one system is shown, but any number of devices and systems may be used to access an electronic document among many users. In addition, in some implementations, the first client 150 can be connected to a server, or an online or cloud-based computing storage service ("cloud storage service"). As first user 100 accesses or interacts with electronic documents via first client 150, various content or metadata associated with the document may be updated, transmitted, received, or saved to/from/by the cloud storage through a network connection.

Figure 10:
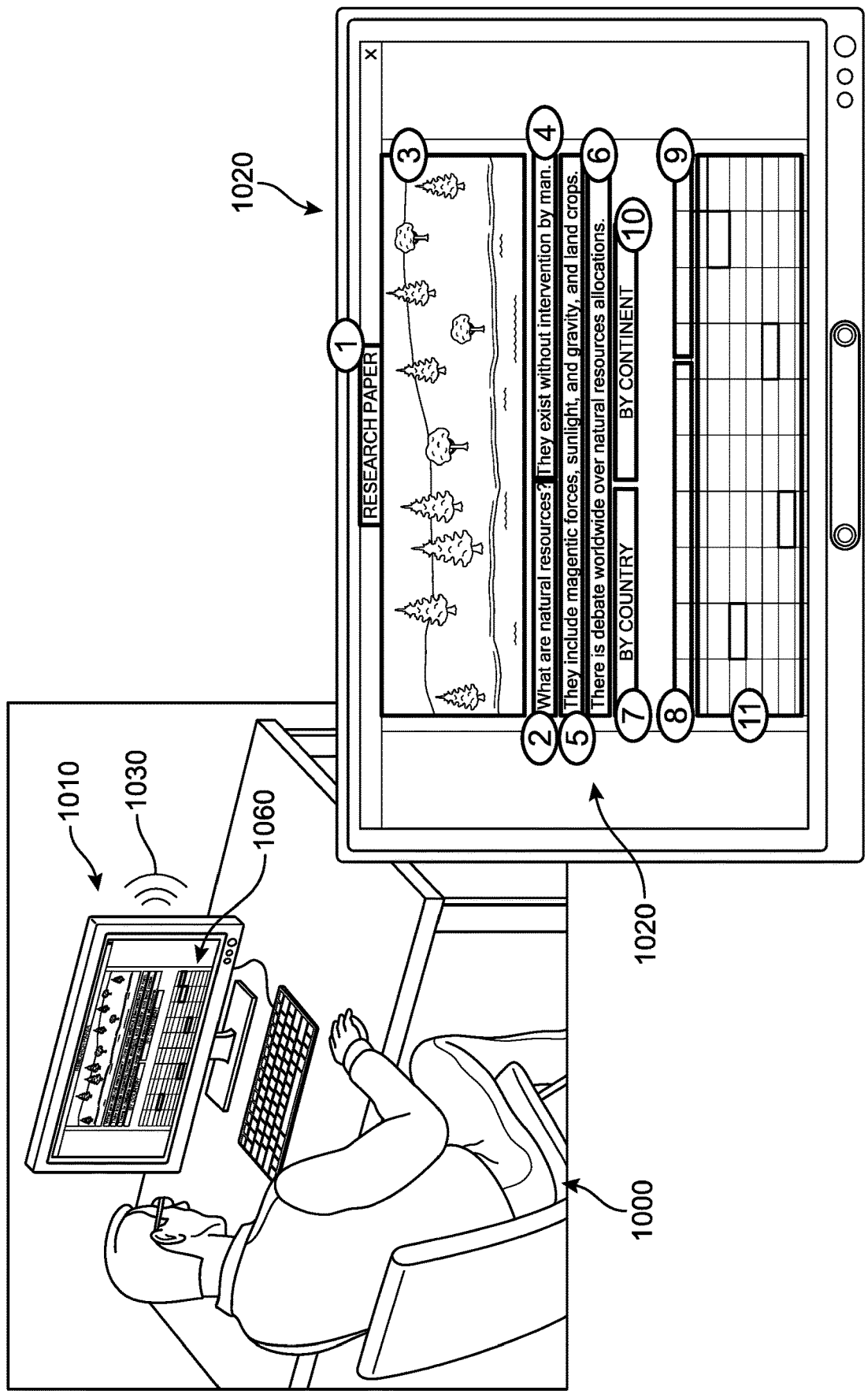
FIG. 10 is an example of a user who is visually impaired enjoying the benefits of an auto-generated reading order having been applied to an electronic content item.

With reference to FIGS. 1A and 1B, in different implementations, a user may rely on or otherwise initiate access of electronic content while employing assistive technologies, such as a screen reader, or any program that is used to read or "speak" the contents of a displayed page (e.g., "document") to a user. It should be understood that while the primary example shown here depicts a person who is blind, in other implementations, the first user 100 may not be visually impaired, but instead be engaged in an activity that limits or restricts their ability to read text on their device (see for example FIG. 10) and can also benefit from the use of screen reader-type technology.

In some implementations, the first user 100 can provide an input corresponding to a request, instruction, or command to the presentation client 160 and/or first client 150 to initiate a playback experience of the document. In another implementation, the user can have previously established settings that automatically initiate document playback upon receipt of a document. The term "playback" or document "playback experience" will generally refer to the delivery of synthesized speech or other audio corresponding to the content of the document to a user via the presentation client 160. Thus, though the term "audio content" may be used throughout this description to generally describe a soundscape associated with a document, the term may also be understood to describe other aspects of the playback experience as displayed or presented by the presentation client, including audio signals and indicators. The presentation client 160 can be configured to play the document and present the associated audio indicators, or may access or utilize another application to provide the auditory content. A user can then benefit from the arrangement in which he or she may safely and efficiently engage in multiple tasks while listening to the playback.

In FIG. 1A, the first user 100 has initiated playback of a document 170. However, the playback experience is confusing and disorienting for the first user 100, as represented by the reading order associated with the document 170. In FIG. 1A, a first reading order 120 has been applied to the document 170. For purposes of illustration only, the first reading order 120 is represented by a series of numbers (1, 2, 3, 4, 5, 6) superimposed on the portion of the drawing depicting the computer screen. These numbers identify the order in which separate content segments or portions are being recited to the first user 100. As one example, in some cases, the reading order provided for a document, such as a PowerPoint® slide, can traditionally be linked to or directly correspond to the order in which each content portion was added to, inserted in, or otherwise created for the slide. This can occur even though the natural or intuitive reading order that a sighted person would implement while reviewing the document 170 may differ significantly. The playback experience (represented by audio streams 110a and 110b) resulting from such a reading order would unfortunately be unpredictable, jarring, and reduce the opportunity for ready consumption and comprehension of the document 170 by the first user 100.

In contrast, following implementation of the systems proposed herein, the reading order assigned to the document 170 can be vastly improved. In FIG. 1B, a second reading order 140 has been applied to the document 170 using the techniques that will be described in detail below. Again for purposes of illustration, the second reading order 140 is being represented by a series of numbers (1, 2, 3, 4, 5, 6) that are superimposed on the portion of the drawing depicting the computer screen. These numbers identify the order in which separate content segments or portions are now being recited to the first user 100. In FIG. 1B, the second reading order 140 follows a pattern that was automatically generated based on eye gaze data of a large group of sighted users reading the document 170. By identifying the typical, natural flow of reading associated with this particular document, generating a more natural and correct reading order for the document, and assigning the reading order to the document, the system offers the first user a playback experience (represented by audio streams 130a and 130b) that conveys the spatially presented information in a flow that facilitates comprehension and is a better fit for conveying the specific material shown to a person.

Figure 2:
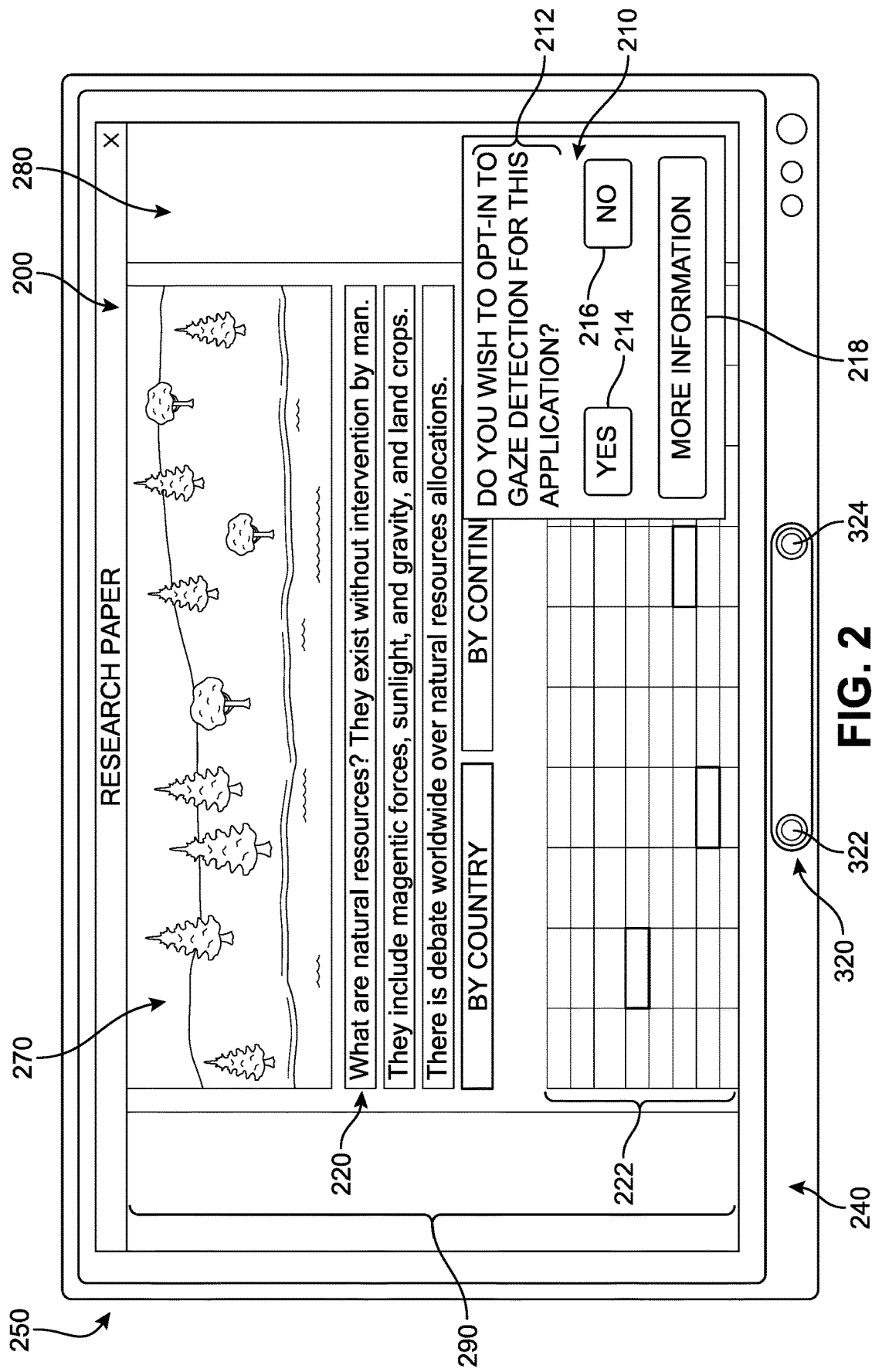
FIG. 2 is a computing device display ("device display") illustrating an implementation of a document presentation user interface requesting user consent to eye gaze detection.

In FIG. 2, a larger view of an implementation of a second client system 250 is depicted, where a device display 240 presents a portion of a second document 200 being accessed during use of a presentation client 280. The portion of the second document 200 currently being displayed on the screen will be referred to as a first electronic content item ("first content item") 290. In this case, the first content item 290 is a mixed media page with a plurality of content portions, such as an image 270, segments of text 220, and cells 222. Furthermore, in this example, the second document 200 is being presented in conjunction with a user interface ("interface") 210.

In general, an "interface" can be understood to refer to a mechanism for communicating content through a client application to an application user. For example, interfaces may include pop-up windows that may be presented to a user via native application user interfaces (UIs), controls, actuatable interfaces, interactive buttons, or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application.

In addition, a "native control" refers to a mechanism for communicating content through a client application to an application user. For example, native controls may include actuatable or selectable options or "buttons" that may be presented to a user via native application UIs, touch-screen access points, menus items, or other virtual objects that may be shown to a user through native application UIs or segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click or selection of a button or other native application object, video associated with a user interface, or other such information presentation.

In this case, the interface 210 has appeared or is being presented to a user upon their opening or access of the particular document. In other implementations, such an interface can be shown when the client system is powered on (i.e., system start up), during initial access of the presentation application, or through other indicators that may be actuated to provide the same or similar functionality. The interface 210 shown in FIG. 2 includes a message 212 and a plurality of options, for example, a first option 214 ("Yes") for authorizing the collection of eye tracking, a second option 216 ("No") to disable eye tracking, and a third option 218 ("More information"). Other implementations may include additional interface options, or fewer.

In FIG. 2, the message 212 of interface 210 asks the user "Do you wish to opt-in to gaze detection for this application?". In other words, in different implementations, in order for eye tracking to occur, the system can first request authorization from the person whose gaze is to be tracked. The authorization can vary widely across different scenarios, where a user may authorize eye tracking for a single page or electronic content item, a single document, only content viewed through a specific application or suite of applications, content viewed via a particular device, or a universal authorization for all sites and content accessed by this user. In addition, the authorization can be configured to be valid indefinitely, or for a specific duration (e.g., a few hours, a day, a week, a month, etc.), or until a predetermined amount of eye data has been collected. In other examples, eye tracking may be authorized and/or configured to occur only when documents from a particular owner or group is viewed (e.g., where that owner desires collection of eye gaze data to improve reading order for their documents). In some implementations, actuation of the third option 218 ("More information") can trigger a settings menu for additional options related to the eye tracking functionality and operation. In some implementations, these options can be accessed independently by the user by navigation to the application or system settings, or settings for the user account.

Furthermore, while the specific relative location of the interface 210 represented in FIG. 2 are intended to underscore the relationship of the consent with the second document 200, it should be understood that in other implementations, each region or feature of the interface 200 may be displayed or generated anywhere else on the screen(s) associated with the client's system, may be hidden, minimized, overlaid, closed, or concealed, and/or may be spaced apart from, adjacent to, or around the main window of the interface.

Figure 3:
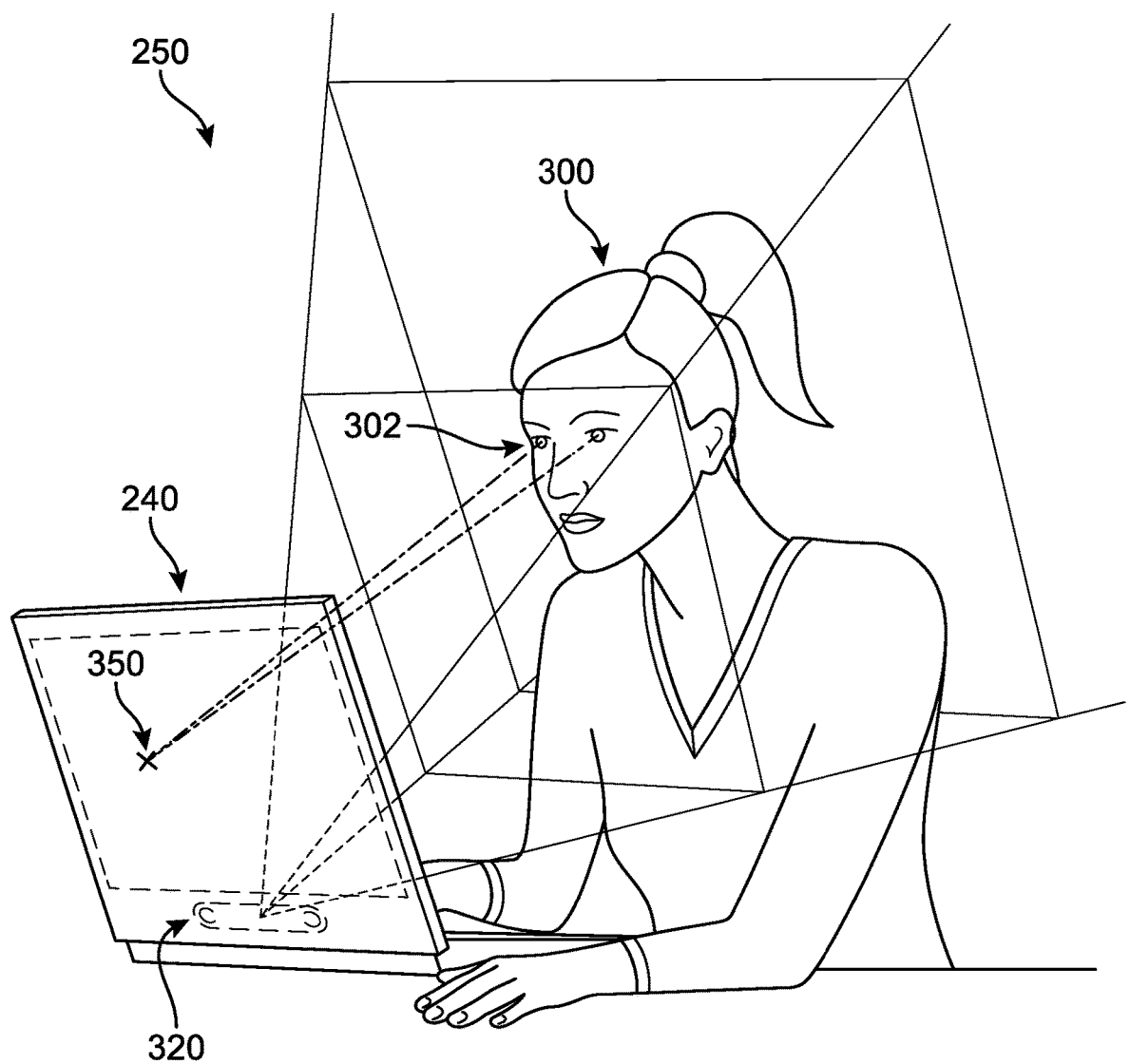
FIG. 3 is an example of a possible technique for obtaining eye gaze data of a user who is viewing a device display currently displaying a document presentation user interface.

For purposes of context, the reader will now be provided with an overview of eye gaze data collection with reference to FIG. 3. As a general matter, eye tracking techniques are used to identify and analyze patterns of visual attention of individuals as they perform specific tasks (e.g. reading, searching, scanning an image, driving, etc.). In many cases, the visual attention of a user can be determined from eye gaze data. At its most basic, attention is defined as the process by which we select a subset from all of the available information for further processing. With respect to the human eye, the narrow, high resolution foveal visual field is generally considered the "focus" of our attention, both visual and cognitive.

Such eye movements are typically analyzed in terms of what are referred to as fixations (or fixation clusters) and saccades. Saccades are the type of eye movement used to move the fovea rapidly from one point of interest to another, while a fixation is the period of time where the eye is kept aligned with the target for a certain duration, allowing for the image details to be processed. Human perception is guided by alternating these sequences of fixations and saccades. Due to the relatively fast movement during a saccade, the image on the retina is of poor quality and information intake thus happens mostly during the fixation period. The average duration of a saccade is 20-40 ms, and saccades do not always have simple linear trajectories (as reflected by FIGS. 4A and 4B). During each saccade, visual acuity is suppressed and, as a result, humans are unable to see at all. Thus, visual perception occurs only through fixations, when the brain virtually integrates the acquired visual images through successive fixations into a visual scene or object (similar to a kind of spatial and temporal sampling). The more complicated, confusing or interesting those features are the longer a person will need to process them and, consequently, more time is spent fixating on them. This eye-mind relationship is what makes it possible to use eye movement measurements to tell us something about human behavior and whether a specific portion of content is being attended to.

Thus, fixations are the most common feature of looking that eye tracking systems can analyze to make inferences about cognitive processes or regions of attention. For purposes of clarity, fixations will be understood to comprise an aggregation (cluster) of gaze points, where gaze points are the instantaneous spatial locations of the visual axis landing on the stimulus. As such, a gaze point has an (x, y) coordinate and a timestamp corresponding to its measurement. Various eye tracking hardware, one example of which is depicted in FIG. 3, can output a distribution of gaze points. As an example, if the eye tracking device is operating at 60 Hz, a gaze point will be reported every 16.7 milliseconds. At 300 Hz, gaze points are spaced 3 milliseconds apart. Fixations can be of great significance and application to determining a user's attention to various content portions. This is because fixations are made up of multiple gaze points, and so have duration (start and end timestamps) in addition to a spatial (x, y) location or region. Furthermore, fixations are not directly measurable, but are rather constructions, outputs of a mathematical algorithm that translates the sequence of raw gaze points into an associated sequence of fixations. The input of the eye tracker-based raw gaze stream data through a fixation filter can reveal useful information about attention, visibility, mental processing, and understanding of the reader. For example, an increase in the time taken to make a first fixation on a target suggests a decrease in the salience or visual attractive power of that feature. An increase in average fixation duration on a target or area could signal greater effort required to make sense of something or could suggest that what is looked at is more engaging. Fixations usually are of a duration varying between 50-600 ms, where the minimum duration required for information intake depends on the task and stimulus.

Referring to FIG. 3, a reading user 300 is shown viewing the device display 240. The device display 240 includes an eye tracker device 320, also visible in FIG. 2. In different implementations, the eye tracker device 320 includes one or more cameras (see a first camera 322 and a second camera 324 in FIG. 2), illuminators, and can have access to or maintain various eye tracking algorithms. The illuminators are used to create a pattern of near-infrared light on eyes 302 of the reading user 300. The cameras can be used to take high-resolution images of the reading user's eyes 302 and capture patterns of eye movement. Image processing algorithms find specific details in the reading user's eyes 302 and reflections patterns. Based on these details, the eyes' position and gaze points 350 are calculated using available eye model algorithm(s).

Thus, over multiple user sessions, eye tracking data for an electronic content item is obtained that comprises a plurality of gaze points that are then spatially and temporally aggregated into fixations. In some implementations, the aggregation area is usually about 20 to 50 pixels, and the timespan between 200 and 300 ms or more. Common metrics for fixations that may be applicable in different implementations are the fixation count (i.e. number of fixations), the fixation duration in milliseconds, and the fixation position given as x- and y-coordinates (in pixel). As noted earlier, these fixations are connected by saccades. A temporal order of fixations will be identified as a "gaze", however, only if the fixations are within an area of interest (AOI) or region of interest (ROI) (e.g., a content portion corresponding to a region of specific interest in the displayed electronic content). A saccade from one AOI to the next will be called a transition, and a complete sequence of alternating fixations and saccades is called a scanpath.

Figure 4A:
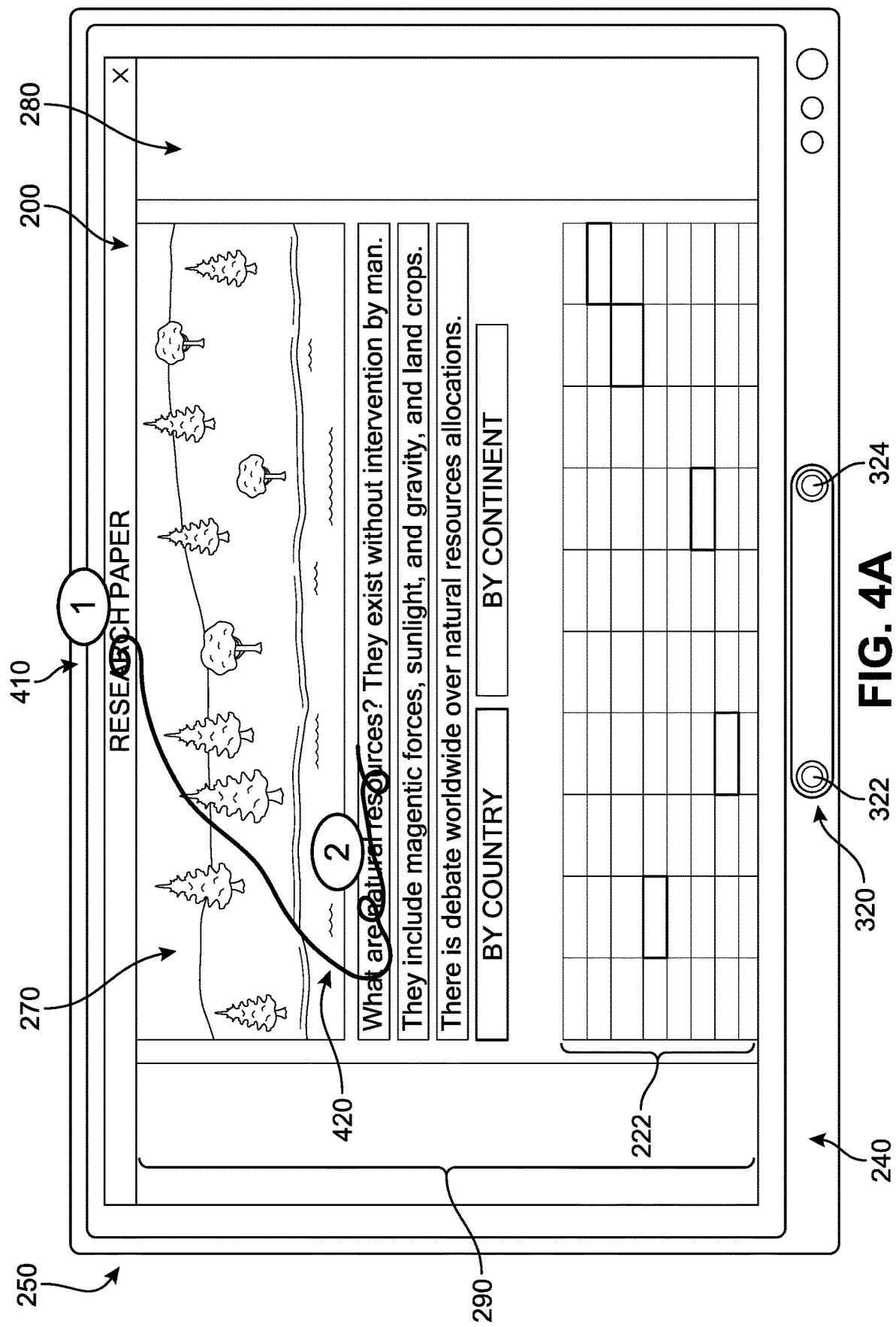
FIGS. 4A and 4B are device displays illustrating an implementation of a document presentation user interface with a fixation sequence corresponding to a user's eye gaze.
Figure 4B:
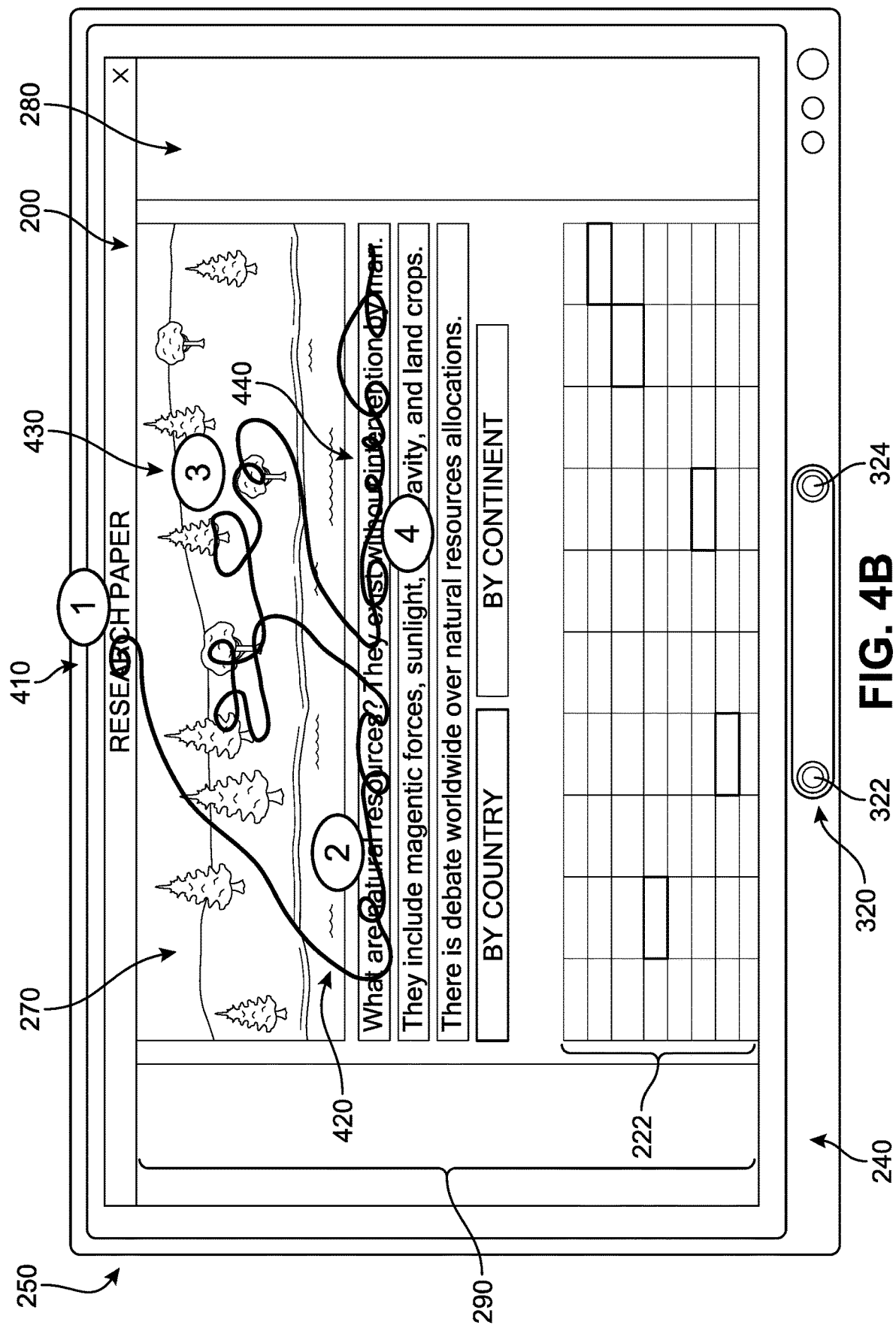

In order to better appreciate the process by which a reading user's order of attention is established, FIGS. 4A and 4B illustrate an implementation in which eye-tracking is being performed as part of a document review. The resulting scanpath can be used as a basis from which to measure the response to varying regions of interest arranged and displayed on the screen. For example, in FIG. 4A, an arrangement of text, empty regions, images, and a portion of a spreadsheet are presented to the user. Each of these content portions will induce the user's eye-movement. Concurrently, eye-tracking techniques are used to detect the reaction of the eyes to the screen layout.

As noted earlier, the reading of a document such as a web page or other content types does not involve a smooth sweeping of the eyes along the contents, but a series of short stops ("fixations") and quick in-between connecting motions ("saccades"). For purposes of this application, the resulting series of fixations and saccades is called a "scanpath". In a typical scanpath visualization, each fixation is indicated by a circle, and saccades between fixations are represented by connecting lines. One example of the development of a scanpath is shown in FIGS. 4A and 4B. In FIG. 4A, the eye tracker device 320 has obtained spatial-temporal eye gaze data for a first duration, and a scanpath is represented (overlaid on the screen). The application of a fixation filter and algorithm translates the eye gaze data into a two-dimensional path extending from a first fixation cluster (1) to a second fixation cluster (2) via a saccade (path segment). The first fixation cluster (1) comprises an aggregation of gaze points associated with a first spatial region 410 and a first time period, and the second fixation cluster (2) comprises an aggregation of gaze points associated with a second spatial region 420 and a second time period, where the first spatial region 410 and the second spatial region 420 are areas of interest that are spaced apart from one another, and the first time period occurred before the second time period.

For purposes of comparison, in FIG. 4B, the eye tracker device 320 has continued to collect eye gaze data, now for a longer second duration (where the second duration includes the first duration), and additional fixation clusters have been produced. Thus, the scanpath continues such that a third fixation cluster (3) extends via a saccade (path segment) from the second fixation cluster (2), and a fourth fixation cluster (4) extends from the third fixation cluster (3) via another saccade (path segment). The third fixation cluster (3) comprises an aggregation of gaze points associated with a third spatial region 430 and a third time period, and the fourth fixation cluster (4) comprises an aggregation of gaze points associated with a fourth spatial region 440 and a fourth time period, where the four spatial regions (1, 2, 3, 4) each correspond to different areas of interest that are spaced apart from one another, and the third time period occurred after the second time period, and the fourth time period occurred after the third time period. In this example, it may be noted that the focus of the user (as determined by the eye gaze) did not move in a consecutive left-to-right direction across content portions, or an up-down direction across the content portions. Instead, while the transition of attention from the first spatial region 410 to the second spatial region 420 was up-down and to the left, the transition of attention at the next stage was down-up and slightly right. In other words, although Western countries and languages (e.g., English, Spanish, French, etc.) are associated with a general left-right and up-down pattern of attention, the actual sequence will also be strongly related to the actual content being presented. In this case, the user attended to the title first, then the first sentence, then the image positioned between the title and the first sentence, before returning to the text below and attending to a second sentence. Obtaining such data to generate a reading order for a document, rather than assume a reading order moves from left to right and up to down, can have great impact on the accuracy of the reading order.

Figure 5A:
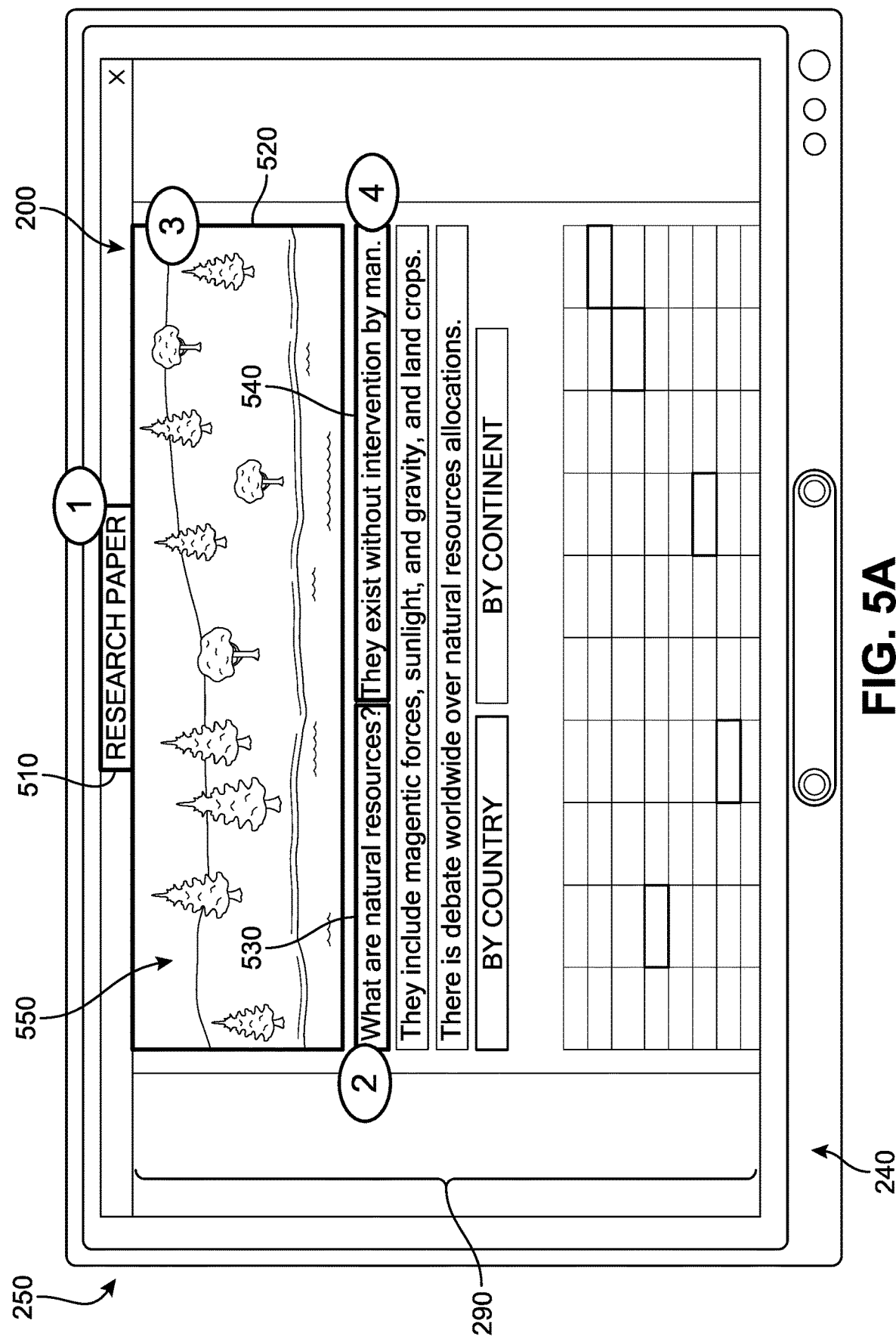
FIGS. 5A and 5B are device displays illustrating an implementation of a document presentation user interface with a user attention sequence based on a user's fixation sequence.
Figure 5B:
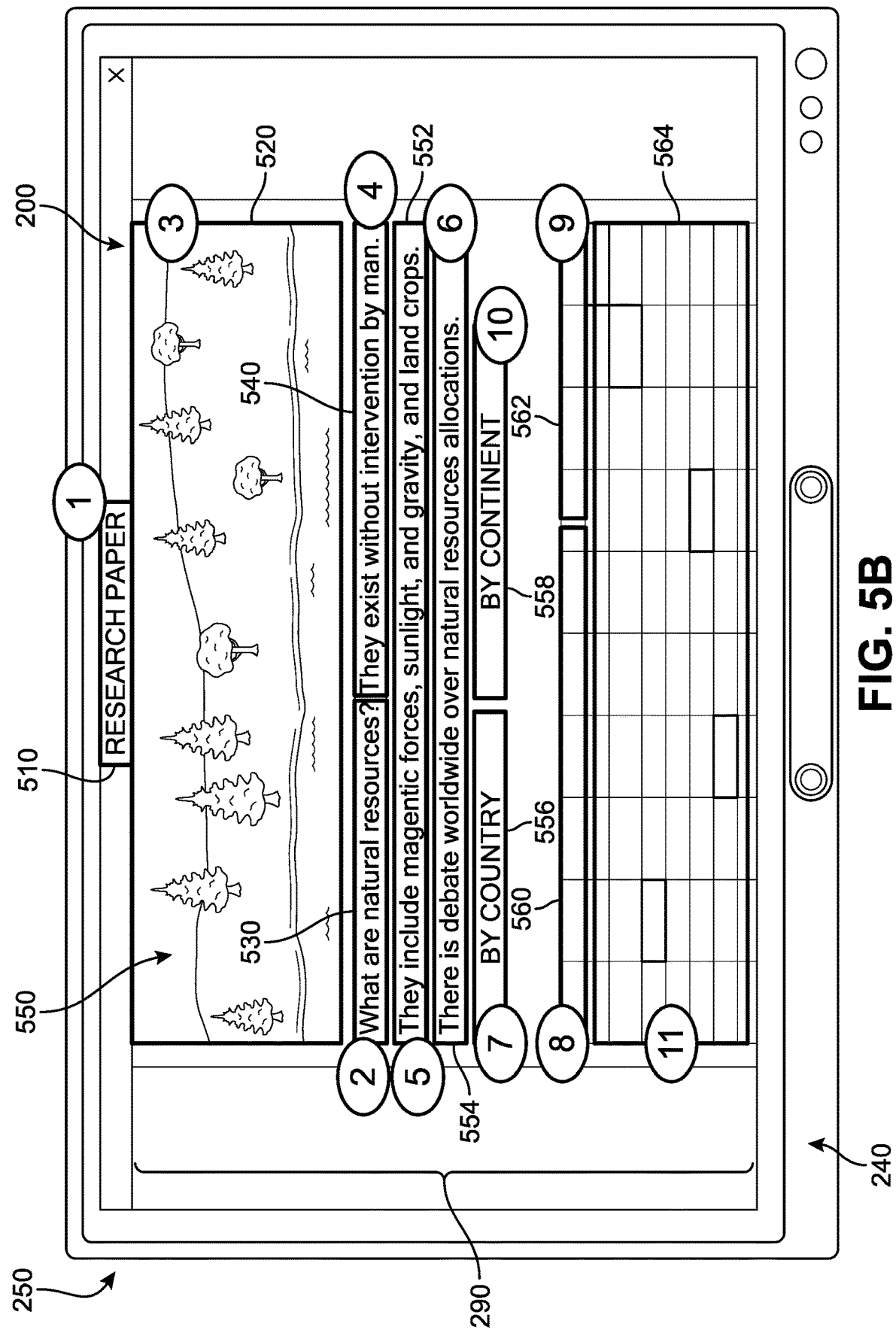
Figure 6:
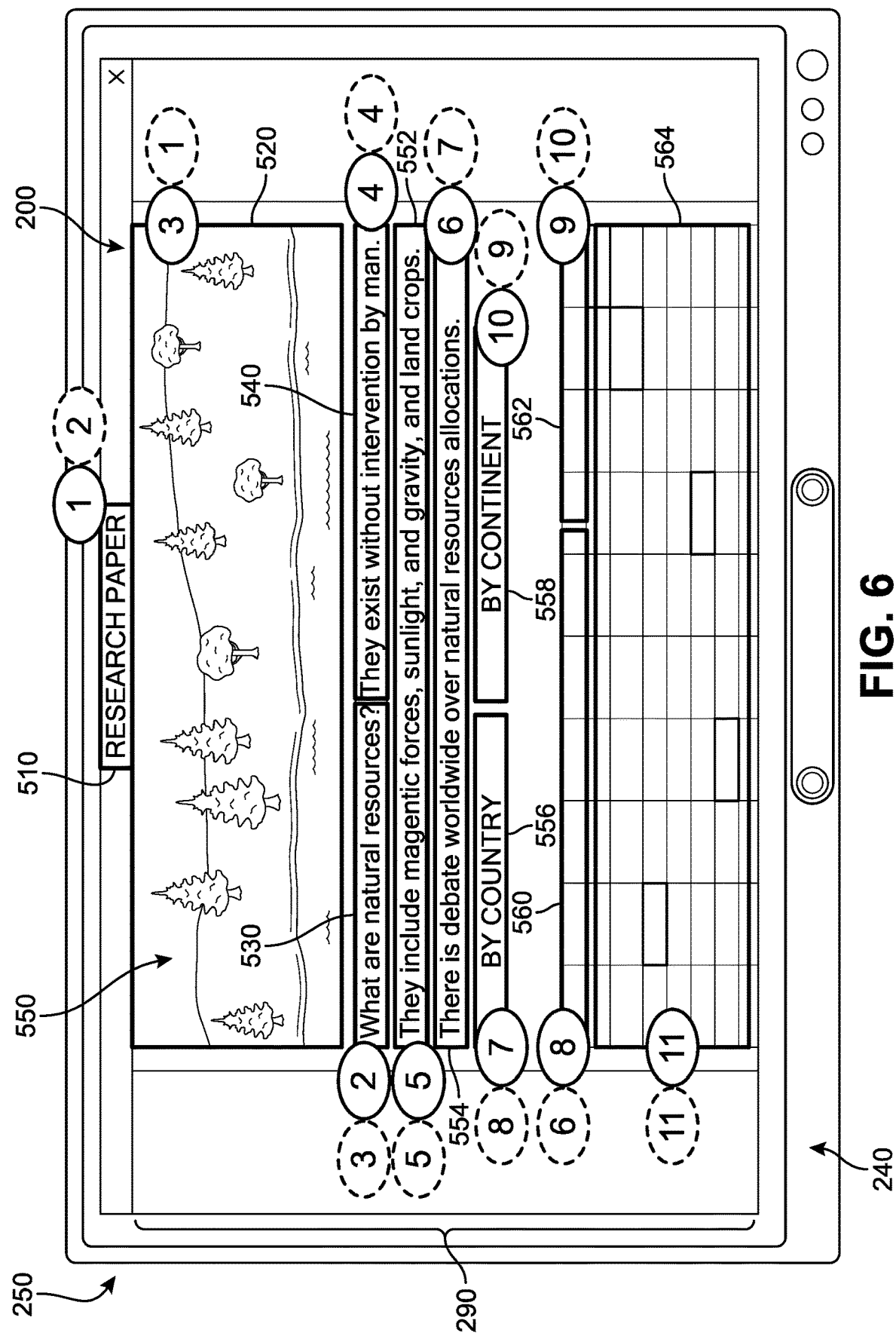
FIG. 6 is a device display illustrating an implementation of a document presentation user interface with two different user attention sequences for the same electronic content item.

Once a path that the user's eyes follow when viewing the display has been determined, the system can link the path to a sequence of "regions of interest" on a scene. For example, a correspondence can be drawn between the scanpath and the content portions of the electronic content item, as shown in FIGS. 5A and 5B. In FIG. 5A, the first content item 290 is shown again on device display 240. For the reader's reference, overlaid on the first content item 290 is a visual attention sequence ("attention sequence") established within the context of a plurality of content portions 550 comprising the electronic content item. For purposes of clarity, each content portion that has been attended to by the user is identified by a bounding box in FIGS. 5A, 5B, and 6. Based on the scanpath of FIG. 4B, a first attention sequence ("first sequence") has been produced in FIG. 5A, which includes: (1st) a first content portion 510 (corresponding to the first spatial region associated with the first fixation cluster), (2nd) a third content portion 530 (corresponding to the second spatial region associated with the second fixation cluster), (3rd) a second content portion 520 (corresponding to the image in the third spatial region associated with the third fixation cluster), and (4th) a fourth content portion 540 (corresponding to the next sentence, or the fourth spatial region associated with the fourth fixation cluster).

As the reader continued his/her reading of the document, additional gaze points were obtained, and a longer scanpath (not shown) was generated reflecting a reading of the entire electronic content item. Based on such a scanpath, a sample attention sequence for a user for the full electronic content item 290 is illustrated in FIG. 5B. In this case, the first sequence continues from the fourth content portion 540 (the second sentence along the same line of text as the first sentence) to (5th) a fifth content portion (552) (the second line of text below, comprising a third sentence), followed by (6th) a sixth content portion 554 (the third line of text below, comprising a fourth sentence), (7th) a seventh content portion 556 (a selectable tab below and to the left), (8th) an eighth content portion 558 (a header directly below the seventh content portion), (9th) a ninth content portion 560 (a header directly to the right of the eighth content portion), (10th) a tenth content portion 562 (returning back up and to the center to another selectable tab), and (11th) an eleventh content portion 564 (returning below to the large panel of spreadsheet-type cells shown in the document).

It can be appreciated that the attention sequences for different people can vary for the same electronic content item, making the collection of eye gaze data for multiple persons of great use in ensuring the accuracy of any subsequently generated reading order. For purposes of comparison, in FIG. 6 the first sequence (dotted line circled numbers) for a first user is shown overlaid on the first electronic content item 240 along with a second sequence (solid line circled numbers) for a second user. It can be observed that while some of the two sequences overlap (i.e., is the same position/rank for the same content portion), some aspects differ. For example, the second sequence differs at the start, where the 1st content attended to is the second content portion 520, the 2nd content attended to is the first content portion 510, and the 3rd content attended to is the third content portion 530. The 5th content attended to is the same in both sequences, and then the 6th content attended in the second sequence is, rather abruptly, the ninth content portion 560, followed by (7th) the sixth content portion 554, (8th) the seventh content portion 556, (9th) the eighth content portion 558, and (10th) the tenth content portion 562. The two sequences realign at the 11th position with the eleventh content portion 564. This type of variation is normal, and expected when collecting eye gaze data for multiple users.

Referring to FIG. 7, for purposes of illustration, a table 700 of sample attention sequences for ten users (readers) 720 is shown. Each of the ten users 720 (identified as User A-User J) were presented with the same electronic content item that included eleven content portions 710 (i.e., Content 1-Content 11). The users 720 had eye gaze tracking enabled during their reading of the content. As they read the material comprising the electronic content, each reader navigated between the eleven content portions in a sequence that is represented by data 750, from $1^{st}$ to $11^{th}$. It may be observed that while five users engaged with the content portions following the same sequence through the eleven content portions (i.e., User C, User D, User F, User G, and User I), other users followed a pattern that varied from the others. However, all users but one (User B) began their reading at content portion #1. Similarly, all users but three (User B, User E, User H) moved to content portion #3 as their second target of attention, and then to content portion #2 as their third target of attention. In addition, all ten users shifted to content portion #4 as their fourth target of attention, and to content portion #5 as their fifth target of attention. Furthermore, all users but two (User B and User J) moved to content portion #6 as their sixth target of attention and then to content portion #7 as their seventh target of attention. All users but three (User A, User B, User J) moved to content portion #8 as their eighth target of attention, and then to content portion #9 as their ninth target of attention. As we near the conclusion of the users' reading experiences, all users but one (User A) shifted to content portion #10 as their tenth target of attention, and then all users ended with content portion #11 as their eleventh target of attention.

Based on this sample set of attention sequences for ten users, the system can determine the reading order that best fits the group's order of attention as a whole. In this case, the reading order generated is primarily a reflection of the five users that had the same attention sequence. In different implementations, based on the type and amount of data and the variations present, a wide range of statistical processes and/or algorithms can be applied to determine the reading order for an electronic content item from a set of eye gaze data, including but not limited to the Majority Vote algorithm, Levenshtein Distance (String-Edit) algorithm, Shortest Common Supersequence (SCS) algorithm, pattern discovery algorithm of the eyePatterns tool, the SPAM algorithm, the T-Pattern (Temporal-Pattern) Detection algorithm, Multiple Sequence Alignment algorithm, Dotplots algorithm, and other algorithms commonly applied to determine a most-common (popular) or 'majority-rules' product that can inform the subsequent reading order.

Figure 8:
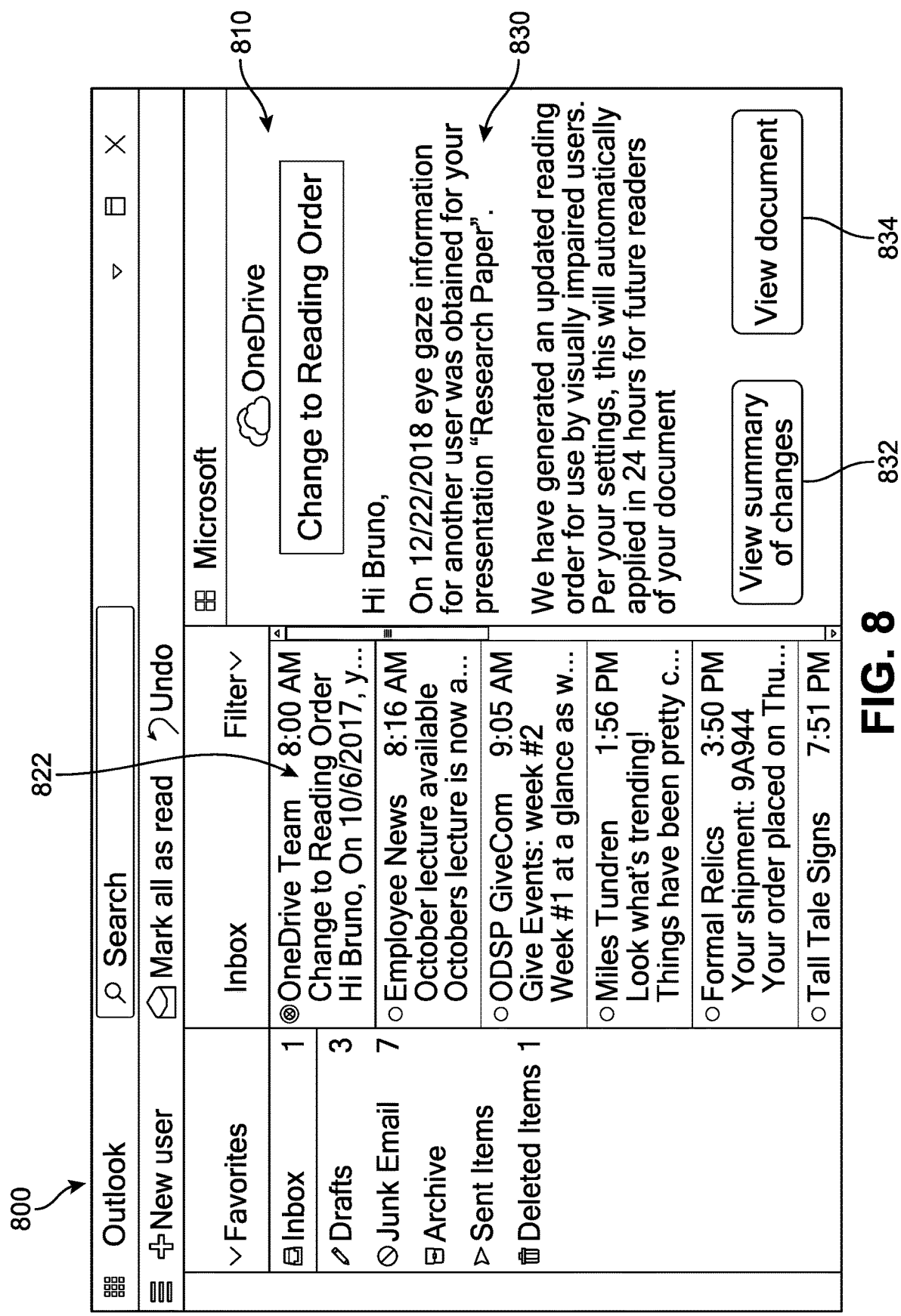
FIG. 8 is a representation of a device display presenting an implementation of a notification of the generation of a reading order.

In some implementations, the system can include provisions for informing a document owner or manager of changes made to the reading order of their document. For example, following the generation or assignment of a reading order for a document, in different implementations, a document manager may be notified via a pop-up message, text message, e-mail, browser window, or other communication presentation means. In some implementations, the message may be provided when the owner returns to the document after the reading order has been assigned. Such notifications can be automated, and may be transmitted per system settings and/or user preferences. One example is shown in FIG. 8, where a user interface 800 displaying e-mail messages for a user account is depicted. While an e-mail message is presented for purposes of this example, it should be understood that in other implementations, any other form of communication associated with the user's account may be used to provide such information, including but not limited to text messages, chat messages, pop-up windows, automated phone calls, symbolic indicators (shown briefly or multiple occasions on the display while the processes occur), or other native controls can be used. In this case, an e-mail message ("message") 810 from the system is delivered to the e-mail account linked to the user account associated with the managing the original file. A subject line 822 alerts the user that this is regarding a "Change to Reading Order". The message 830 includes a summary that can inform the user of the reading order generation and/or assignment event that was detected ("Hi Bruno, On Dec. 22, 2018 eye gaze information for another use was obtained for your presentation 'Research Paper.' We have generated an updated reading order for use by visually impaired users [for your document]. Per your settings, this will be automatically applied in 24 hours for future readers of your document.")

In one implementation, this can further be followed by options that can describe a suggested next step related to this event (actuatable option 832 "View summary of changes") that can redirect the user to additional information about the reading order, or a link 834 for accessing the document itself and viewing the changes directly. Such options can also offer or allow the user to navigate to other menu interfaces from which the user can make changes to their notification and document management settings, as well as undo a reading order change (or creation) if so desired. For example, the user may wish to opt-out of one or more steps of the automated processes, opt-in to other services to increase automation, and/or request that notifications be provided via a different mechanism.

Figure 9:
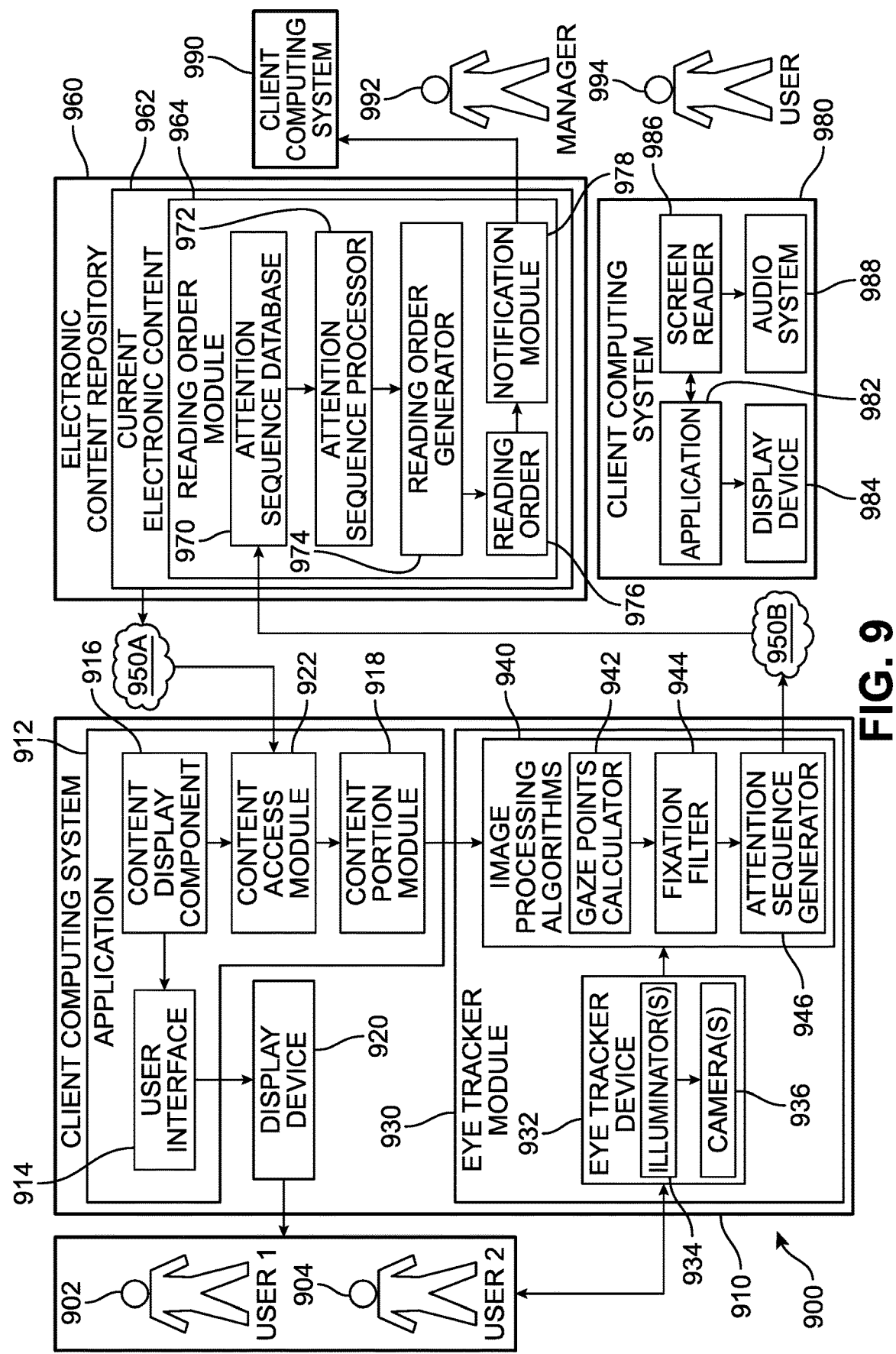
FIG. 9 is an implementation of a system for generating a reading order for electronic content using eye gaze data.

Referring now to FIG. 9, an example of a representative architecture of a reading order management system ("system") 900 is depicted. In different implementations, the system 900 can be configured to present user interfaces for viewing and/or accessing electronic content. The system 900 can be further configured to present additional user interfaces for receiving notifications and modifying reading orders. It can be understood that the system 900 presented here is merely an example implementation and that a wide variety of other implementations are possible.

In different implementations, the system 900 can include one or more end-user systems, such as a first client computing system ("first system") 910, a second client computing system ("second system") 980, and a third client computing system ("third system") 994 for use by various types of users. In this example, a first user (reader) 902 and a second user (reader) 904 are shown for purposes of illustration as potential users of the first system 910 that is configured to collect eye gaze data. In addition, a third user (document manager) 992 is an end-user of the second system 980, and a fourth user (listener) 994 is an end-user of the third system 990. As noted earlier, the system 900 initially can involve the collection of eye gaze data from one or more users. The first system 910 in this example includes a display device 920 used in connection with an application 912 to display graphical elements generated by a user interface 914 to users 902 and 904. The first system 910 also includes one or more input devices such as an eye tracker module 930 used to receive and record signals obtained by an eye tracker device 932 during the user's reading of various electronic content items, as well as other input devices (not shown) for receiving commands or other input from the users such as a keyboard, mouse, touchpad, or other input devices. Each of the users (such as the first user 902 and the second user 904) of the application 912 may be associated with different user identifiers, such as usernames and/or numbers that can be used during record-keeping or classification of any eye gaze data.

The user interface 914 included in the application 912 generates various graphical user interfaces for viewing and editing a current electronic content 962 that may be stored or created locally (not shown) or accessed and shared via a cloud service 950*a*. In some examples, the current electronic content 962 has been retrieved, using a content access module 922, from an electronic content repository 960; for example the current electronic content 962 stored in the electronic content repository 960, or from corresponding storage locations or online webpage services and providers (not shown). The user interface 914 may be configured to generate the various user interfaces described throughout this application in connection with FIGS. 1-8, including but not limited to electronic content items, menus, submenus, options, sub-options, indicators, dialog boxes, messages, e-mails, pop-up messages, dialog windows, and other input or presentation interfaces. The user interface 914 further includes a content display component 916 configured to cause portions of the current electronic content 962 to be presented on the display device 920. In addition, a content portion module 918 is configured to receive data (e.g., metadata) about the current electronic content 962 and/or process the current electronic content 962 to determine, for each displayed electronic content item shown to a user, the designated content portions. This information will be shared with and used by the eye tracker module 930, as described below.

As described in this disclosure, a user (such as first user 902) may attend to an electronic content item displayed to them via display device 920 and, during this time, have eye gaze data collected. The eye tracker device 932, comprising cameras 932 and illuminators 936, can be configured to initiate a data collection (e.g., recording) session when the user accesses a particular document. For example, information regarding the fixation clusters and saccadic eye movements between the fixations points (i.e., scanpath data) may be gathered using eye tracking devices such as devices provided by Tobii (e.g., Tobii T60™ eye tracker) or other eye tracking systems. An eye-tracking device such as the Tobii T60™ eye tracker is capable of capturing information related to the saccadic eye activity including location of gaze points, fixations, fixation durations, and other data related to a scene or stimulus image, such as a webpage for example, while the user views the scene. The Tobii T60™ uses infrared light sources and cameras to gather information about the user's eye movements while viewing a scene. In addition, the scanpath data may be received in various formats, for example, depending upon the source of the data. In one implementation, scanpath data received by the eye tracking module 930 can comprise data related to a path or plurality of paths to be analyzed by the module. In some cases, scanpath data for an electronic content item may comprise information identifying a sequence of points included in the path, and possibly other path related information. For example, for a scanpath, data may comprise information related to a sequence of gaze points defining the scanpath. The data may optionally include other information related to a scanpath such as the duration of each gaze point, likely fixation points, inter-fixation angles, inter-fixation distances, and etc.

Thus, if a user has consented to eye tracking, the eye tracker device 932 may be automatically activated or engaged when a target document or webpage or other electronic content is being viewed or sent to display device 920. Once the user has completed their viewing of a particular electronic content item, data collected by the eye tracker device 932 is then submitted for processing to an image processing algorithms module 940, which can for example detect gaze points in the data via a gaze points calculator 942. A fixation filter 944 is applied to the gaze points and a series of fixations determined for some or all of the identified content portions for that particular electronic content item. In some implementations, the image processing algorithms can be used to process path data and, for example, identify patterns within the data. For example, fixation filter 944 can receive a set of gaze points and times and can analyze these scanpaths to identify patterns, i.e., similar or matching portions therein. For example, the system can perform a linear regression process on the points to identify sequential matches between the paths or portions of the paths, i.e., between two or more sub-sequences of fixation points. Furthermore, as noted above, such information regarding the fixation points and saccadic eye movements between the fixation points, may be gathered using eye tracking devices such as devices capable of capturing information related to the saccadic eye activity including location of fixation points, fixation durations, and other data related to a scene or stimulus image while the user views the content portions in said scene or image. Such a stimulus image can comprise, for example, a webpage or other user interface which, based on analysis of various scanpaths may be evaluated for possible improvements to the format or layout thereof. In cases where the document is a webpage, the content portions can refer to any number of elements which each, or some of which, can be considered a particular region of interest on that webpage. For example, a webpage may be considered to comprise multiple regions such as: A (page header), B (page navigation area), C (page sidebar), D (primary tabs area), E (subtabs area), F (table header), G (table left), H (table center), I (table right), J (table footer), and K (page footer), and any other segments.

Resultant fixations are then used to produce an attention sequence via an attention sequence generator 946 that identifies the order in which the user attended to each content portion. This process can make user of, for example, variational hidden Markov models (HMMs) and discriminant analysis (DA), linear discriminant analysis (LDA), support vector machine with linear kernel (SVM), relevance vector machine (RVM), AdaBoost, ScanMatch, k-means clustering algorithms, and other gaze tracking algorithms and mapping tools known in the art. The attention sequence will be sent to an attention sequence database 970 via a cloud service 950*b*, where the database is associated with the current electronic content 962. The attention sequence database 970 is configured to store the attention sequence as one of a plurality of attention sequences from many users that correspond to or are directed to the specific electronic content item that was displayed to the user.

It should be understood that while the image processing occurs locally in the example of FIG. 9, in other implementations, the application of image processing algorithms module 940 can be performed in the cloud, for example in conjunction with a reading order module 964 associated with the current electronic content 962. In other words, data obtained by the eye tracker device 932 of the first system 910 may instead be sent to a remote processing module for detection of fixations and generation of an attention sequence for that particular user and that particular electronic content item.

In some implementations, the reading order module 964 can also include an attention sequence processor 972 that is configured to receive the information stored in the attention sequence database 970 in order to prepare the data and/or produce metrics describing the data for use by a reading order generator 974. The reading order generator 974 can apply one or more algorithms (see FIG. 7) to the raw or processed data and generate a reading order that represents the most accurate or user-friendly reading order that should be used when accessing a particular portion of electronic content. Thus, there may be many reading orders generated for and associated with a single electronic content, as a single electronic content (e.g., a document, webpage, etc.) can include a large number of display-pages worth of content (i.e., items). In some implementations, as discussed earlier, a notification can be automatically triggered and sent to an owner, creator, or manager of the electronic content, as illustrated by the transmission of a message from a notification module 978 to second system 990 associated with third user 992. Furthermore, the reading order(s) can be automatically or manually assigned to the content and be made available for use by future users of the same content. For example, as shown in FIG. 9, as the fourth user 994 utilizes application 982 at second system 980 and accesses the current electronic content 962, the reading order(s) 976 for the document can also be transmitted or shared with the application 982. When the fourth user 992 engages a screen reader 986 or other such assistive technology requesting a recitation of the content being shown via a display device 984, the reading order 976 can be applied and presented as audio via audio system 988 for the benefit of the user.

Figure 11:
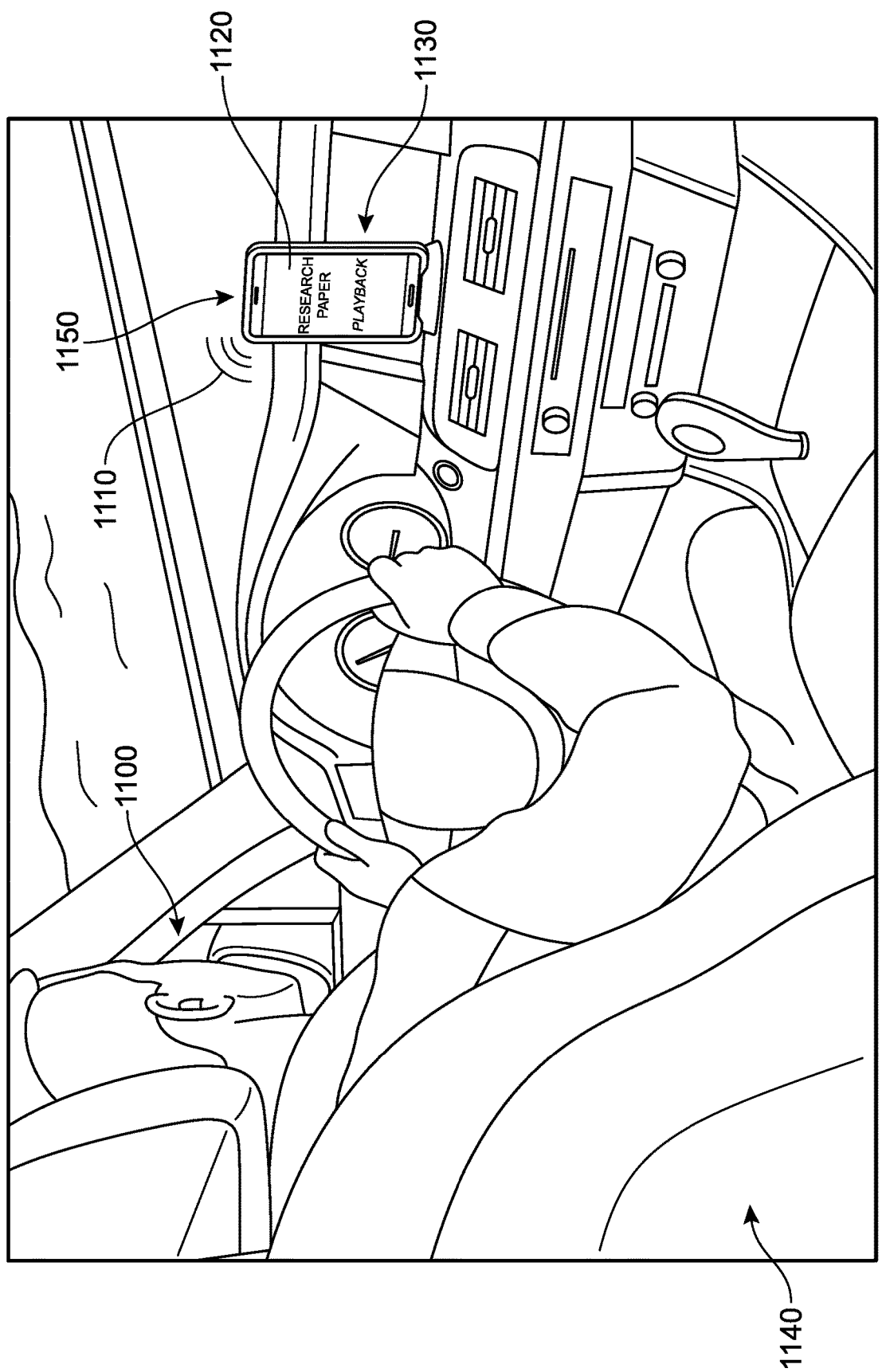
FIG. 11 is an example of a distracted user enjoying the benefits of an auto-generated reading order having been applied to an electronic content item.

The application of this system can benefit a wide range of end-user types. For example, in FIG. 10, a user who is visually impaired ("user") 1000 is shown listening to an audio stream 1030 corresponding to the content of a document 1060, a portion of which is being shown on a display device 1020 of a client system 1010. The user 1000 is able to activate a screen reader and the content shown can be played back in a reading order 1040 that corresponds to the sequence in which the majority of reading users experienced the document, generated and assigned as described herein. Similarly, in FIG. 11, a driver ("distracted user") 1100 is shown listening to an audio stream 1110 corresponding to the content of a webpage 1120 being presented on a display 1130 of a mobile computing device 1150. The driver 1100 in this case is occupied with the task of safely operating the vehicle toward a desired destination. The driver 1100 is able to request the playback of the webpage that relies on a reading order generated by reference to a larger group of users who had read the document. Rather than being required to listen to random, unpredictable, or confusing sequence of playback of content portions in the electronic content, the users can enjoy a more meaningful engagement with the material even when unable to directly see or read the content.

Figure 12:
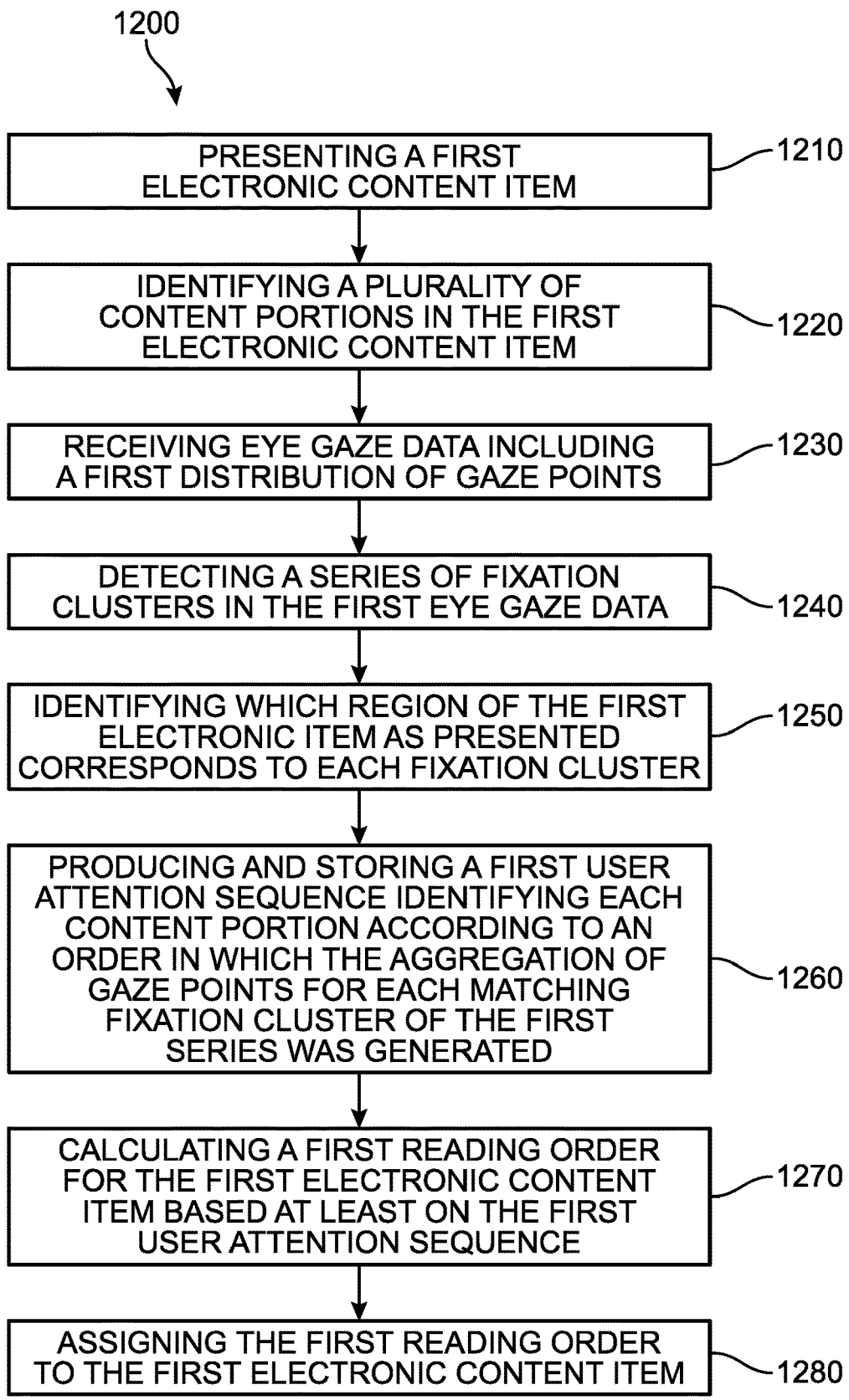
FIG. 12 is a flow chart depicting an implementation of a processes for generating a reading order.

FIG. 12 is a flow chart illustrating an implementation of a method 1200 of a method of assigning a reading order for audio playback of electronic content items. In a first step 1210 the method includes presenting, via a first client system, a first electronic content item. A second step 1220 includes identifying a first plurality of content portions of the first electronic content item. Each content portion is associated with a different region of the first electronic content item as presented, such as a region of interest. The content portions can be pre-identified by the owner of the document, or the document can undergo a pre-presentation process in which the application or the reading order module determines the most likely segments of text and other content that correspond to distinct, discrete target regions for user attention. A third step 1230 includes receiving, from the first client system, first eye gaze data generated during the presentation of the first electronic content item. The first eye gaze data includes a first distribution of gaze points. A fourth step 1240 includes detecting a first series of fixation clusters in the first eye gaze data. As noted earlier, each fixation cluster corresponds to an aggregation of gaze points within the first distribution of gaze points that occur closely in time and space. A fifth step 1250 includes identifying which region of the first electronic item as presented corresponds to each fixation cluster and assigning each fixation cluster a content portion of the first plurality of content portions associated with that region. A sixth step 1260 includes producing and storing a first user attention sequence identifying each content portion according to an order in which the aggregation of gaze points for each matching fixation cluster of the first series was generated (temporal order). A seventh step 1270 includes calculating or generating a first reading order for the first electronic content item based at least on the first user attention sequence, and an eighth step 1280 includes (automatically) assigning the first reading order to the first electronic content item.

In other implementations, the method may include additional steps or aspects. In some implementations, the plurality of content portions can include a first content portion assigned to a first fixation cluster and a second content portion assigned to a second fixation cluster. In this case, the first content portion is ranked higher than the second content portion in the first user attention sequence based on a first set of gaze points comprising the first fixation cluster having been generated prior to a second set of gaze points comprising the second fixation cluster. In another example, the plurality of content portions further includes a third content portion assigned to a third fixation cluster, and the third content portion is ranked higher than the second content portion and lower than the first content portion based on a third set of gaze points comprising the third fixation cluster having been generated prior to the second set of gaze points and subsequent to the first set of gaze points.

In some implementations, the method may also include steps such as presenting, via a second client system, the first electronic content item, and then receiving, from the second client system, second eye gaze data generated during the presentation of the first electronic content item, the second eye gaze data including a second distribution of gaze points, followed by a step of detecting a second series of fixation clusters in the second eye gaze data, each fixation cluster comprising an aggregation of gaze points within the second distribution of gaze points that occur closely in time and space. The method can further include producing and storing a second user attention sequence identifying each content portion according to an order in which the aggregation of gaze points for each matching fixation cluster of the second series was generated, and then calculating the first reading order for the first electronic content item based at least on the second user attention sequence.

In another example, the method may involve generating a message including the calculated reading order for the first electronic content item, automatically transmitting the message to an owner of the first electronic content item, and also receiving authorization from the owner to assign the reading order to the first electronic content item. In one implementation, the method can also include presenting, via the first client system and prior to receiving the first eye gaze data, a user interface requesting user consent to eye gaze data collection, and then receiving, from the first client system, consent to collect eye gaze data.

In some implementations, the method can include steps such as presenting, via a third client system and after assigning the first reading order to the first electronic content item, the first electronic content item, as well as receiving, from the third client system, a request to playback the first electronic content item, and also causing the third client system to begin playback of the first electronic content as synthesized speech based on the first reading order. As another example, the method may further include presenting, via the first client system, a second electronic content item, identifying a second plurality of content portions of the second electronic content item, each content portion associated with a different region of the second electronic content item as presented, and receiving, from the first client system, second eye gaze data generated during the presentation of the second electronic content item, the second eye gaze data including a second distribution of gaze points. In such cases, the method may also include detecting a second series of fixation clusters in the second eye gaze data, each fixation cluster comprising an aggregation of gaze points within the second distribution of gaze points that occur closely in time and space, identifying which region of the second electronic item as presented corresponds to each fixation cluster and assigning each fixation cluster a content portion of the second plurality of content portions associated with that region, producing and storing a second user attention sequence identifying each content portion according to an order in which the aggregation of gaze points for each matching fixation cluster of the second series was generated, calculating a second reading order for the second electronic content item based at least on the second user attention sequence, where the second reading order differs from the first reading order, and assigning the second reading order to the second electronic content item. In one example, the first electronic content item is a first slide of a slideshow and the second electronic content item is a second slide of the same slideshow, and in another example, the first electronic content item is a spreadsheet and the second electronic content item is a webpage.

Implementations of the present disclosure can make use of any of the features, systems, components, devices, and methods described in U.S. Pat. No. 8,434,867 to Helfman et al., granted May 7, 2013 and titled "Finding sequential matches in eye tracking data"; U.S. Pat. No. 10,282,533 to Linderman, granted May 7, 2019 and titled "System and method for eye tracking during authentication"; U.S. Pat. No. 8,069,125 to Jung et al., granted Nov. 29, 2011 and titled "Methods and systems for comparing media content"; U.S. Pat. No. 8,649,606 to Zhao et al., granted Feb. 11, 2014 and titled "Methods and systems for generating saliency models through linear and/or nonlinear integration"; U.S. Pat. No. 9,239,956 to Hein, granted Jan. 19, 2016 and titled "Method and apparatus for coding of eye and eye movement data"; the disclosures of each of which are herein incorporated by reference in their entirety.

The detailed examples of systems, devices, and techniques described in connection with FIGS. 1-12 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-12 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 13:
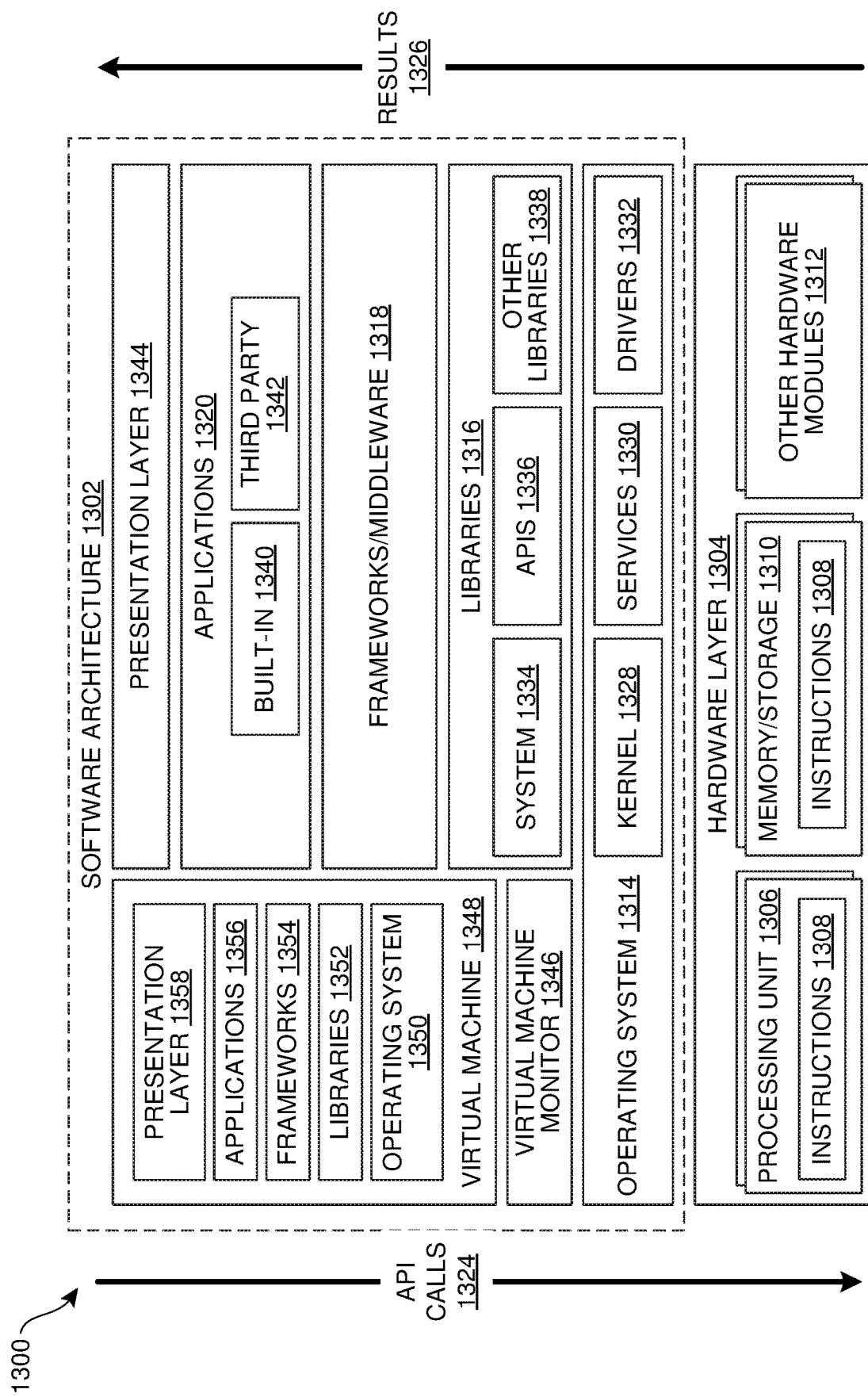
FIG. 13 is a block diagram of an example computing device, which may be used to provide implementations of the mechanisms described herein.

FIG. 13 is a block diagram 1300 illustrating an example software architecture 1302, various portions of which may be used in conjunction with various hardware architectures herein described, which may implement any of the above-described features. FIG. 13 is a non-limiting example of a software architecture and it will be appreciated that many other architectures may be implemented to facilitate the functionality described herein. The software architecture 1302 may execute on hardware that includes, among other things, document storage, processors, memory, and input/output (I/O) components. A representative hardware layer 1304 is illustrated and can represent, a computing device. The representative hardware layer 1304 includes a processing unit 1306 and associated executable instructions 1308. The executable instructions 1308 represent executable instructions of the software architecture 1302, including implementation of the methods, modules and so forth described herein. The hardware layer 1304 also includes a memory/storage 1310, which also includes the executable instructions 1308 and accompanying data. The hardware layer 1304 may also include other hardware modules 1312. Instructions 1308 held by processing unit 1308 may be portions of instructions 1308 held by the memory/storage 1310.

The example software architecture 1302 may be conceptualized as layers, each providing various functionality. For example, the software architecture 1302 may include layers and components such as an operating system (OS) 1314, libraries 1316, frameworks 1318, applications 1320, and a presentation layer 1344. Operationally, the applications 1320 and/or other components within the layers may invoke API calls 1324 to other layers and receive corresponding results 1326. The layers illustrated are representative in nature and other software architectures may include additional or different layers. For example, some mobile or special purpose operating systems may not provide the frameworks/middleware 1318.

The OS 1314 may manage hardware resources and provide common services. The OS 1314 may include, for example, a kernel 1328, services 1330, and drivers 1332. The kernel 1328 may act as an abstraction layer between the hardware layer 1304 and other software layers. For example, the kernel 1328 may be responsible for memory management, processor management (for example, scheduling), component management, networking, security settings, and so on. The services 1330 may provide other common services for the other software layers. The drivers 1332 may be responsible for controlling or interfacing with the underlying hardware layer 1304. For instance, the drivers 1332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1316 may provide a common infrastructure that may be used by the applications 1320 and/or other components and/or layers. The libraries 1316 typically provide functionality for use by other software modules to perform tasks, rather than rather than interacting directly with the OS 1314. The libraries 1316 may include system libraries 1334 (for example, C standard library) that may provide functions such as memory allocation, string manipulation, file operations. In addition, the libraries 1316 may include API libraries 1336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1316 may also include a wide variety of other libraries 1338 to provide many functions for applications 1320 and other software modules.

The frameworks 1318 (also sometimes referred to as middleware) provide a higher-level common infrastructure that may be used by the applications 1320 and/or other software modules. For example, the frameworks 1318 may provide various graphic user interface (GUI) functions, high-level resource management, or high-level location services. The frameworks 1318 may provide a broad spectrum of other APIs for applications 1320 and/or other software modules.

The applications 1320 include built-in applications 1340 and/or third-party applications 1342. Examples of built-in applications 1340 may include, but are not limited to, a contacts application, a browser application, a location application, a media application, a messaging application, and/or a game application. Third-party applications 1342 may include any applications developed by an entity other than the vendor of the particular platform. The applications 1320 may use functions available via OS 1314, libraries 1316, frameworks 1318, and presentation layer 1344 to create user interfaces to interact with users.

Some software architectures use virtual machines, as illustrated by a virtual machine 1348. The virtual machine 1348 provides an execution environment where applications/modules can execute as if they were executing on a hardware machine (such as the machine 1000 of FIG. 10, for example). The virtual machine 1348 may be hosted by a host OS (for example, OS 1314) or hypervisor, and may have a virtual machine monitor 1346 which manages operation of the virtual machine 1348 and interoperation with the host operating system. A software architecture, which may be different from software architecture 1302 outside of the virtual machine, executes within the virtual machine 1348 such as an OS 1350, libraries 1352, frameworks 1354, applications 1356, and/or a presentation layer 1358.

Figure 14:
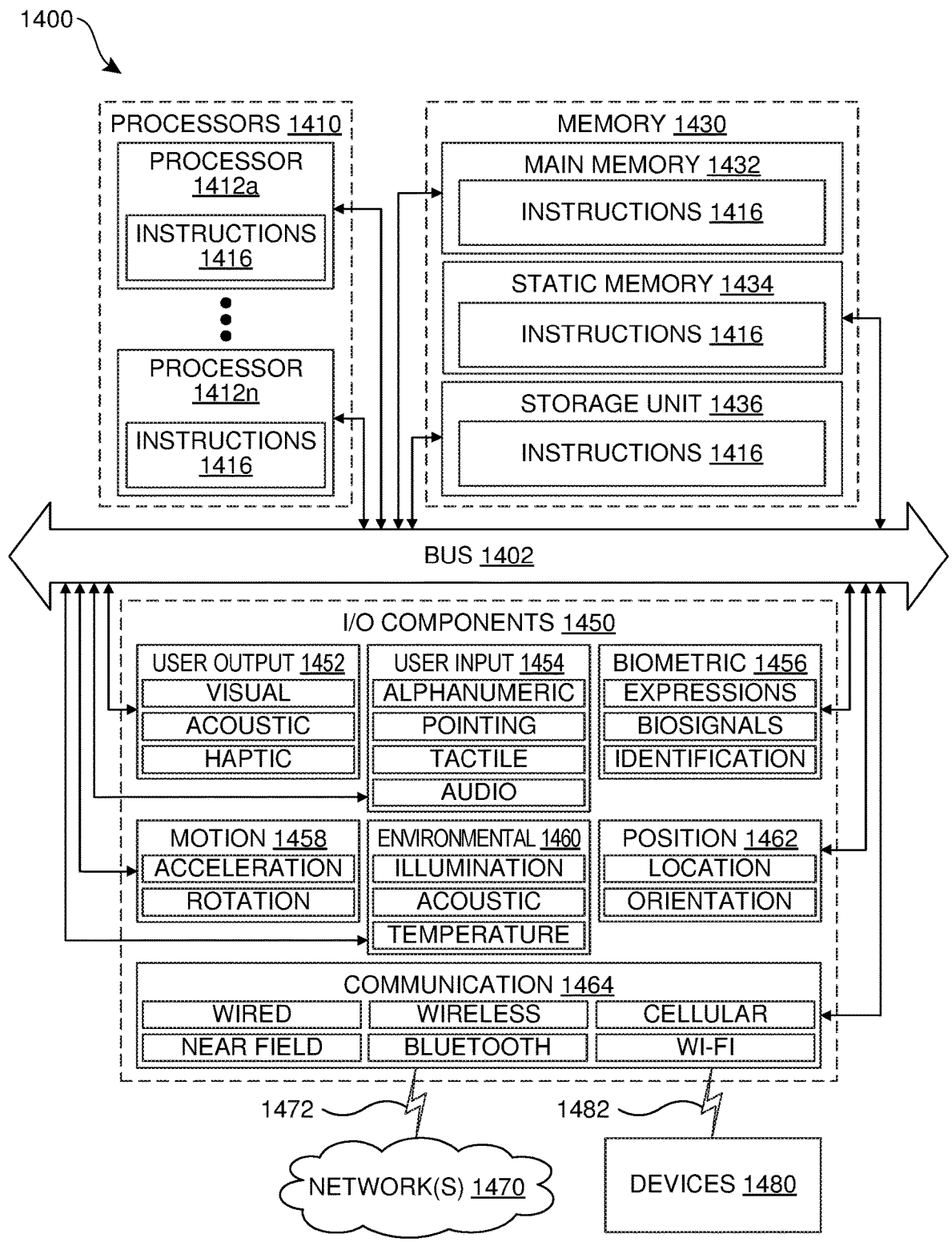
FIG. 14 is a block diagram illustrating components of an example machine configured to read instructions from a machine-readable medium.

FIG. 14 is a block diagram illustrating components of an example machine 1400 configured to read instructions from a machine-readable medium (for example, a machine-readable storage medium) and perform any of the features described herein. It is to be understood that the phrase "machine-readable medium" and "computer-readable medium" are interchangeable in their usage herein. The example machine 1400 is in a form of a computer system, within which instructions 1416 (for example, in the form of software components) for causing the machine 1400 to perform any of the features described herein may be executed. As such, the instructions 1416 may be used to implement modules or components described herein. The instructions 1416 cause unprogrammed and/or unconfigured machine 1400 to operate as a particular machine configured to carry out the described features. The machine 1400 may be configured to operate as a standalone device or may be coupled (for example, networked) to other machines. In a networked deployment, the machine 1400 may operate in the capacity of a server machine or a client machine in a server-client network environment, or as a node in a peer-to-peer or distributed network environment. Machine 1400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1400 is illustrated, the term "machine" includes a collection of machines that individually or jointly execute the instructions 1416.

The machine 1400 may include processors 1410, memory 1430, and I/O components 1450, which may be communicatively coupled via, for example, a bus 1402. The bus 1402 may include multiple buses coupling various elements of machine 1400 via various bus technologies and protocols. In an example, the processors 1410 (including, for example, a central processing unit (CPU), a graphics processing unit (GPU), a digital signal processor (DSP), an ASIC, or a suitable combination thereof) may include one or more processors 1412a to 1412n that may execute the instructions 1416 and process data. In some examples, one or more processors 1410 may execute instructions provided or identified by one or more other processors 1410. The term "processor" includes a multi-core processor including cores that may execute instructions contemporaneously. Although FIG. 14 shows multiple processors, the machine 1400 may include a single processor with a single core, a single processor with multiple cores (for example, a multi-core processor), multiple processors each with a single core, multiple processors each with multiple cores, or any combination thereof. In some examples, the machine 1400 may include multiple processors distributed among multiple machines.

The memory/storage 1430 may include a main memory 1432, a static memory 1434, or other memory, and a storage unit 1436, both accessible to the processors 1410 such as via the bus 1402. The storage unit 1436 and memory 1432, 1434 store instructions 1416 embodying any one or more of the functions described herein. The memory/storage 1430 may also store temporary, intermediate, and/or long-term data for processors 1410. The instructions 1416 may also reside, completely or partially, within the memory 1432, 1434, within the storage unit 1436, within at least one of the processors 1410 (for example, within a command buffer or cache memory), within memory at least one of I/O components 1450, or any suitable combination thereof, during execution thereof. Accordingly, the memory 1432, 1434, the storage unit 1436, memory in processors 1410, and memory in I/O components 1450 are examples of machine-readable medium.

As used herein, "machine-readable medium" refers to a device able to temporarily or permanently store instructions and data that cause machine 1400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1416) for execution by a machine 1400 such that the instructions, when executed by one or more processors 1410 of the machine 1400, cause the machine 1400 to perform and one or more of the features described herein. Accordingly, a "machine-readable medium" may refer to a single storage device, as well as "cloud-based" storage systems or storage networks that include multiple storage apparatus or devices.

The I/O components 1450 may include a wide variety of hardware components adapted to receive input, provide output, produce output, transmit information, exchange information, capture measurements, and so on. The specific I/O components 1450 included in a particular machine will depend on the type and/or function of the machine. For example, mobile devices such as mobile phones may include a touch input device, whereas a headless server or IoT device may not include such a touch input device. The particular examples of I/O components illustrated in FIG. 14 are in no way limiting, and other types of components may be included in machine 1400. The grouping of I/O components 1450 are merely for simplifying this discussion, and the grouping is in no way limiting. In various examples, the I/O components 1450 may include user output components 1452 and user input components 1454. User output components 1452 may include, for example, display components for displaying information (for example, a liquid crystal display (LCD) or a projector), acoustic components (for example, speakers), haptic components (for example, a vibratory motor or force-feedback device), and/or other signal generators. User input components 1454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1450 may include biometric components 1456 and/or position components 1462, among a wide array of other environmental sensor components. The biometric components 1456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1462 may include, for example, location sensors (for example, a Global Position System (GPS) receiver), altitude sensors (for example, an air pressure sensor from which altitude may be derived), and/or orientation sensors (for example, magnetometers).

The I/O components 1450 may include communication components 1464, implementing a wide variety of technologies operable to couple the machine 1400 to network(s) 1470 and/or device(s) 1480 via respective communicative couplings 1472 and 1482. The communication components 1464 may include one or more network interface components or other suitable devices to interface with the network(s) 1470. The communication components 1464 may include, for example, components adapted to provide wired communication, wireless communication, cellular communication, Near Field Communication (NFC), Bluetooth communication, Wi-Fi, and/or communication via other modalities. The device(s) 1480 may include other machines or various peripheral devices (for example, coupled via USB).

In some examples, the communication components 1464 may detect identifiers or include components adapted to detect identifiers. For example, the communication components 1464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1462, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:
1. A system comprising:
a processor; and
machine-readable media including instructions which, when executed by the processor, cause the processor to:

present, via a first client system, a first electronic content item;
identify a first plurality of content portions of the first electronic content item, each content portion associated with a different region of the first electronic content item as presented;
receive, from the first client system, first eye gaze data generated during the presentation of the first electronic content item, the first eye gaze data including a first distribution of gaze points calculated based on reflection patterns from light on eyes of a user;
detect a first series of fixation clusters in the first eye gaze data, each fixation cluster comprising an aggregation of gaze points within the first distribution of gaze points that occur closely in time and space;
identify which region of the first electronic item as presented corresponds to each fixation cluster and assigning each fixation cluster a content portion of the first plurality of content portions associated with that region;
produce and store a first user attention sequence identifying an order in which the user attended to each content portion, the order in which the user attended to each content portion being based on an order in which the aggregation of gaze points for each matching fixation cluster of the first series was generated;
calculate a first reading order for the first electronic content item based at least on the first user attention sequence;
assign the first reading order to the first electronic content item;
present, via a second client system and after assigning the first reading order to the first electronic content item, the first electronic content item;
receive, from the second client system, a request to playback the first electronic content item; and
cause the second client system to begin playback of the first electronic content item as synthesized speech based on the first reading order.

2. The system of claim 1, wherein the first plurality of content portions include a first content portion assigned to a first fixation cluster and a second content portion assigned to a second fixation cluster, and where the first content portion is ranked higher than the second content portion in the first user attention sequence based on a first set of gaze points comprising the first fixation cluster having been generated prior to a second set of gaze points comprising the second fixation cluster.

3. The system of claim 2, wherein the first plurality of content portions further includes a third content portion assigned to a third fixation cluster, and where the third content portion is ranked higher than the second content portion and lower than the first content portion based on a third set of gaze points comprising the third fixation cluster having been generated prior to the second set of gaze points and subsequent to the first set of gaze points.

4. The system of claim 1, wherein the instructions further cause the processor to:
present, via a third client system, the first electronic content item;
receive, from the third client system, second eye gaze data generated during the presentation of the first electronic content item, the second eye gaze data including a second distribution of gaze points;
detect a second series of fixation clusters in the second eye gaze data, each fixation cluster comprising an aggregation of gaze points within the second distribution of gaze points that occur closely in time and space;
produce and store a second user attention sequence identifying each content portion according to an order in which the aggregation of gaze points for each matching fixation cluster of the second series was generated; and
calculate the first reading order for the first electronic content item further based on the second user attention sequence.

5. The system of claim 1, wherein the instructions further cause the processor to:
generate a message including the calculated first reading order for the first electronic content item;
automatically transmit the message to an owner of the first electronic content item; and
receive authorization from the owner to assign the first reading order to the first electronic content item.

6. The system of claim 1, wherein the instructions further cause the processor to:
present, via the first client system and prior to receiving the first eye gaze data, a user interface requesting user consent to collect the first eye gaze data; and
receive, from the first client system, the user consent to collect the first eye gaze data.

7. The system of claim 1, wherein the instructions further cause the processor to:
present, via the first client system, a second electronic content item;
identify a second plurality of content portions of the second electronic content item, each content portion associated with a different region of the second electronic content item as presented;
receive, from the first client system, second eye gaze data generated during the presentation of the second electronic content item, the second eye gaze data including a second distribution of gaze points;
detect a second series of fixation clusters in the second eye gaze data, each fixation cluster comprising an aggregation of gaze points within the second distribution of gaze points that occur closely in time and space;
identify which region of the second electronic item as presented corresponds to each fixation cluster and assigning each fixation cluster a content portion of the second plurality of content portions associated with that region;
produce and store a second user attention sequence identifying each content portion according to an order in which the aggregation of gaze points for each matching fixation cluster of the second series was generated;
calculate a second reading order for the second electronic content item based at least on the second user attention sequence, wherein the second reading order differs from the first reading order; and
assign the second reading order to the second electronic content item.

8. The system of claim 7, wherein the first electronic content item is a first slide of a slideshow and the second electronic content item is a second slide of the slideshow.

9. The system of claim 7, wherein the first electronic content item is a spreadsheet and the second electronic content item is a webpage.

10. A method of assigning a reading order for audio playback of electronic content items, the method comprising:
presenting, via a first client system, a first electronic content item;

identifying a first plurality of content portions of the first electronic content item, each content portion associated with a different region of the first electronic content item as presented;

receiving, from the first client system, first eye gaze data generated during the presentation of the first electronic content item, the first eye gaze data including a first distribution of gaze points calculated based on reflection patterns from light on eyes of a user;

detecting a first series of fixation clusters in the first eye gaze data, each fixation cluster comprising an aggregation of gaze points within the first distribution of gaze points that occur closely in time and space;

identifying which region of the first electronic item as presented corresponds to each fixation cluster and assigning each fixation cluster a content portion of the first plurality of content portions associated with that region;

producing and storing a first user attention sequence identifying an order in which the user attended to each content portion, the order in which the user attended to each content portion being based on an order in which the aggregation of gaze points for each matching fixation cluster of the first series was generated;

calculating a first reading order for the first electronic content item based at least on the first user attention sequence; and assigning the first reading order to the first electronic content item;

presenting, via a second client system and after assigning the first reading order to the first electronic content item, the first electronic content item;

receiving, from the second client system, a request to playback the first electronic content item; and causing the second client system to begin playback of the first electronic content item as synthesized speech based on the first reading order.

11. The method of claim 10, wherein the first plurality of content portions include a first content portion assigned to a first fixation cluster and a second content portion assigned to a second fixation cluster, and where the first content portion is ranked higher than the second content portion in the first user attention sequence based on a first set of gaze points comprising the first fixation cluster having been generated prior to a second set of gaze points comprising the second fixation cluster.

12. The method of claim 11, wherein the first plurality of content portions further includes a third content portion assigned to a third fixation cluster, and where the third content portion is ranked higher than the second content portion and lower than the first content portion based on a third set of gaze points comprising the third fixation cluster having been generated prior to the second set of gaze points and subsequent to the first set of gaze points.

13. The method of claim 10, further comprising:
presenting, via a third client system, the first electronic content item;
receiving, from the third client system, second eye gaze data generated during the presentation of the first electronic content item, the second eye gaze data including a second distribution of gaze points;
detecting a second series of fixation clusters in the second eye gaze data, each fixation cluster comprising an aggregation of gaze points within the second distribution of gaze points that occur closely in time and space;
producing and storing a second user attention sequence identifying each content portion according to an order in which the aggregation of gaze points for each matching fixation cluster of the second series was generated; and
calculating the first reading order for the first electronic content item based at least on the second user attention sequence.

14. The method of claim 10, further comprising:
generating a message including the calculated first reading order for the first electronic content item;
automatically transmitting the message to an owner of the first electronic content item; and
receiving authorization from the owner to assign the first reading order to the first electronic content item.

15. The method of claim 10, further comprising:
presenting, via the first client system and prior to receiving the first eye gaze data, a user interface requesting user consent to collect the first eye gaze data; and
receiving, from the first client system, the user consent to collect the first eye gaze data.

16. The method of claim 10, further comprising:
presenting, via the first client system, a second electronic content item;
identifying a second plurality of content portions of the second electronic content item, each content portion associated with a different region of the second electronic content item as presented;
receiving, from the first client system, second eye gaze data generated during the presentation of the second electronic content item, the second eye gaze data including a second distribution of gaze points;
detecting a second series of fixation clusters in the second eye gaze data, each fixation cluster comprising an aggregation of gaze points within the second distribution of gaze points that occur closely in time and space;
identifying which region of the second electronic item as presented corresponds to each fixation cluster and assigning each fixation cluster a content portion of the second plurality of content portions associated with that region;
producing and storing a second user attention sequence identifying each content portion according to an order in which the aggregation of gaze points for each matching fixation cluster of the second series was generated;
calculating a second reading order for the second electronic content item based at least on the second user attention sequence, wherein the second reading order differs from the first reading order; and
assigning the second reading order to the second electronic content item.

17. The method of claim 16, wherein the first electronic content item is a first slide of a slideshow and the second electronic content item is a second slide of the slideshow.

18. A machine-readable medium on which are stored instructions that, when executed, cause a processor of a programmable device to perform operations of:
presenting, via a first client system, a first electronic content item;
identifying a first plurality of content portions of the first electronic content item, each content portion associated with a different region of the first electronic content item as presented;
receiving, from the first client system, first eye gaze data generated during the presentation of the first electronic content item, the first eye gaze data including a first distribution of gaze points calculated based on reflection patterns from light on eyes of a user;

detecting a first series of fixation clusters in the first eye gaze data, each fixation cluster comprising an aggregation of gaze points within the first distribution of gaze points that occur closely in time and space;

identifying which region of the first electronic item as presented corresponds to each fixation cluster and assigning each fixation cluster a content portion of the first plurality of content portions associated with that region;

producing and storing a first user attention sequence identifying an order in which the user attended to each content portion, the order in which the user attended to each content portion being based on an order in which the aggregation of gaze points for each matching fixation cluster of the first series was generated;

calculating a first reading order for the first electronic content item based at least on the first user attention sequence; and assigning the first reading order to the first electronic content item;

presenting, via a second client system and after assigning the first reading order to the first electronic content item, the first electronic content item;

receiving, from the second client system, a request to playback the first electronic content item; and causing the second client system to begin playback of the first electronic content item as synthesized speech based on the first reading order.

\* \* \* \* \*